US008886212B2

(12) United States Patent
Habicher

(10) Patent No.: US 8,886,212 B2
(45) Date of Patent: Nov. 11, 2014

(54) MOBILE TRACKING

(75) Inventor: Michael Franz Habicher, Toronto (CA)

(73) Assignee: BlackBerry Limited, Waterloo (CA)

( * ) Notice: Subject to any disclaimer, the term of this patent is extended or adjusted under 35 U.S.C. 154(b) by 363 days.

(21) Appl. No.: 12/861,979

(22) Filed: Aug. 24, 2010

(65) Prior Publication Data

US 2012/0052870 A1 Mar. 1, 2012

(51) Int. Cl.
H04W 24/00 (2009.01)
H04W 8/16 (2009.01)
H04W 4/04 (2009.01)

(52) U.S. Cl.
CPC . *H04W 8/16* (2013.01); *H04W 4/04* (2013.01)
USPC .................. 455/456.1; 455/456.3; 455/404.2; 455/420; 340/990; 340/539.18

(58) Field of Classification Search
USPC ......... 455/456.1, 456.3, 420, 404.2; 340/990, 340/539.18
See application file for complete search history.

(56) References Cited

U.S. PATENT DOCUMENTS

| 7,561,063 | B2 * | 7/2009 | Eckhart | 340/901 |
|---|---|---|---|---|
| 8,180,371 | B1 * | 5/2012 | Izdepski et al. | 455/456.1 |
| 8,458,085 | B1 * | 6/2013 | Yakubov | 705/38 |
| 2003/0065952 | A1 * | 4/2003 | Otsuka | 713/201 |
| 2003/0096577 | A1 * | 5/2003 | Heinonen et al. | 455/41 |
| 2003/0100326 | A1 * | 5/2003 | Grube et al. | 455/515 |
| 2004/0054428 | A1 * | 3/2004 | Sheha et al. | 700/56 |
| 2006/0063539 | A1 * | 3/2006 | Beyer, Jr. | 455/456.3 |
| 2006/0105783 | A1 * | 5/2006 | Giraldin et al. | 455/456.3 |
| 2006/0199612 | A1 * | 9/2006 | Beyer et al. | 455/556.2 |
| 2006/0229058 | A1 * | 10/2006 | Rosenberg | 455/404.2 |
| 2007/0078595 | A1 * | 4/2007 | Song | 701/208 |
| 2007/0233367 | A1 * | 10/2007 | Chen et al. | 701/207 |
| 2008/0096519 | A1 * | 4/2008 | Miegel | 455/404.2 |
| 2008/0102809 | A1 * | 5/2008 | Beyer | 455/420 |
| 2008/0102856 | A1 * | 5/2008 | Fortescue et al. | 455/456.1 |
| 2008/0132252 | A1 * | 6/2008 | Altman et al. | 455/457 |
| 2008/0146250 | A1 * | 6/2008 | Aaron | 455/456.3 |
| 2009/0005072 | A1 * | 1/2009 | Forstall et al. | 455/456.1 |
| 2009/0143079 | A1 * | 6/2009 | Klassen et al. | 455/456.3 |

(Continued)

FOREIGN PATENT DOCUMENTS

| GB | 2416964 A | 2/2006 |
|---|---|---|
| WO | 2008099240 A1 | 8/2008 |

OTHER PUBLICATIONS

Office Action dated Jun. 29, 2011 from corresponding EP Patent Application.
European Search Report from corresponding EP Application dated Feb. 25, 2011.

(Continued)

*Primary Examiner* — Kashif Siddiqui
*Assistant Examiner* — Mong-Thuy Tran
(74) *Attorney, Agent, or Firm* — Gowling Lafleur Henderson LLP

(57) ABSTRACT

A method of tracking a lead mobile device entails receiving tracking data that includes a current location for both the lead mobile device and at least one other mobile device that is also tracking the lead device. The method also entails displaying the current locations of the lead device and of the at least one other mobile device that is also receiving the tracking data. A related method shares tracking data with other mobile devices by activating a communication application, communicating with a plurality of other mobile devices via the communication application, and receiving user input to cause the mobile device to transmit tracking data to the plurality of other mobile devices.

24 Claims, 20 Drawing Sheets

(56) References Cited

U.S. PATENT DOCUMENTS

| | | | |
|---|---|---|---|
| 2010/0179756 A1* | 7/2010 | Higgins et al. | 701/210 |
| 2011/0093583 A1* | 4/2011 | Piemonte et al. | 709/224 |
| 2011/0130131 A1* | 6/2011 | Hanson et al. | 455/416 |

OTHER PUBLICATIONS

Willke T L et al "A survey of Inter-vehicle communication protocol's and their applications" IEEE Communications Surveys, IEEE. Apr. 1, 2009—abstract, pp. 3-8 paragraph i-iii, figure 1 and table 1.
U.S. Appl. No. 11/950,285, filed Dec. 4, 2007.

* cited by examiner

MOBILE TRACKING

CROSS-REFERENCE TO RELATED APPLICATIONS

This is the first application filed for the present invention.

TECHNICAL FIELD

The present technology relates generally to mobile devices and, in particular, to techniques for sharing location and other tracking data with other mobile devices.

BACKGROUND

An increasing number of wireless communications devices or mobile devices have Global Positioning System (GPS) chipsets that provide current location data which may be used for various navigation applications.

Transmitting the current location data from one mobile device to another enables one mobile user to follow another mobile user. In a similar vein are covert GPS tracking devices that are meant to be attached to a target's vehicle without the knowledge and consent of the target. These covert devices provide only static location updates, either automatically (i.e. periodically) or upon remote request. In a "consensual" tracking scenario, the leader may periodically send his GPS coordinates to the follower to enable the follower to plot the static position data using a mapping application. However, due to the time lag in generating, transmitting and mapping the position data, by the time the second mobile user sees the "current" location of the first mobile user, the location is no longer "current". This is particularly problematic when the second mobile user is following the first mobile user at high speed, such as in their respective cars or other vehicles, in which case the time lag between updates may make it difficult to follow the first mobile user. This problem is further exacerbated in densely populated urban areas where the density of roads makes it less apparent which route or routes need to be taken in order to reach the most recently received location update of the first mobile user. Although one solution might appear to entail more frequent position updates, this would undesirably burden the onboard processors of both the sender's and recipient's devices, not to mention using up valuable wireless bandwidth with the extra over-the-air transmissions.

With the increasing popularity of mobile navigation applications, further improvements to mobile tracking technology remain highly desirable.

BRIEF DESCRIPTION OF THE DRAWINGS

Further features and advantages of the present technology will become apparent from the following detailed description, taken in combination with the appended drawings, in which.

It will be noted that throughout the appended drawings, like features are identified by like reference numerals.

DETAILED DESCRIPTION

Figure 1:
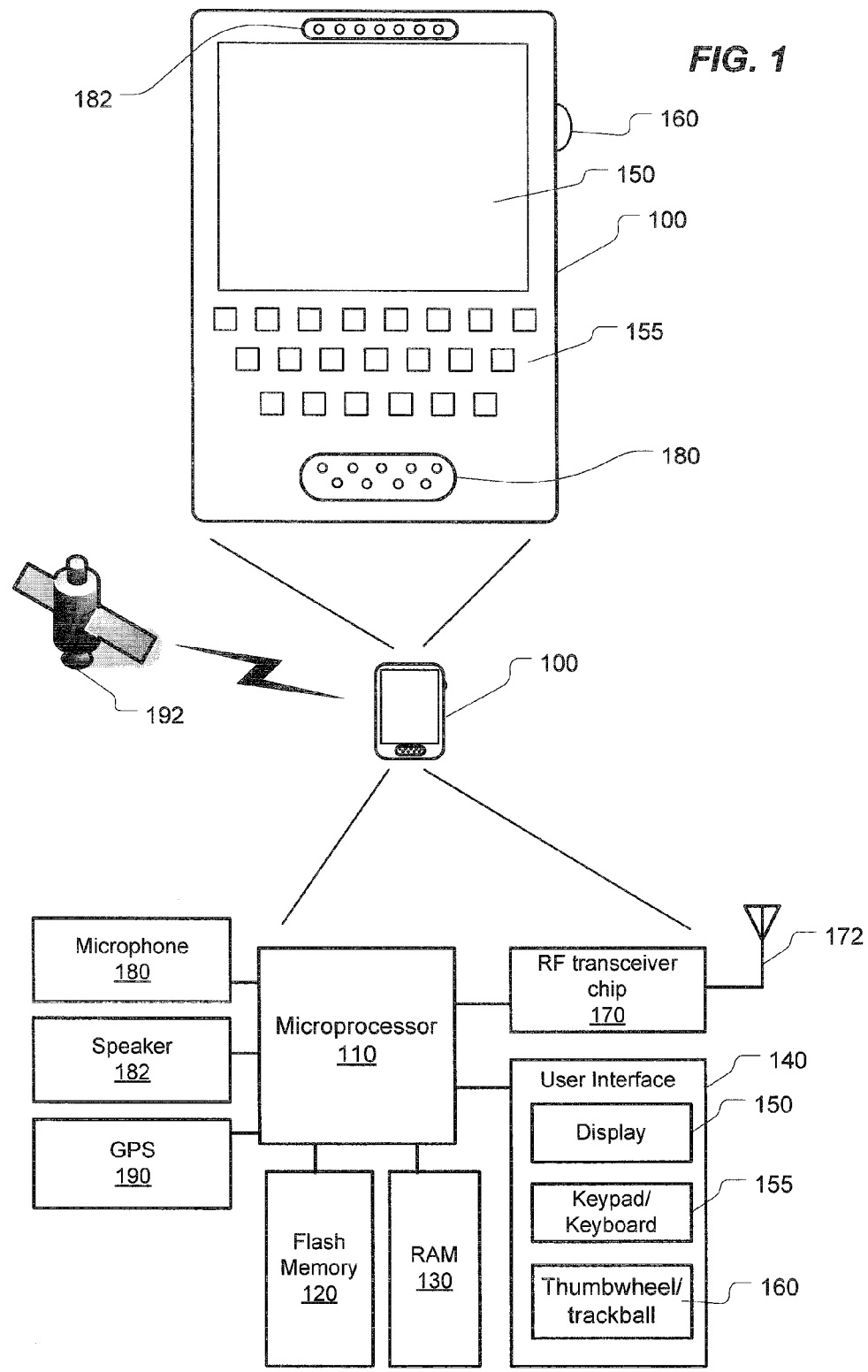
FIG. 1 is a schematic depiction of a wireless communications device as one example of a mobile device on which the present technology can be implemented.

The present technology generally provides novel methods and devices for tracking a lead mobile device. This technology enables a lead device to share tracking data (e.g. current location, speed, heading, path) with a plurality of following devices. This novel technology is primarily designed to enable a plurality of mobile users to follow a leader.

In one main implementation of this technology, the current locations of the lead device, the user's device, and all other following devices are displayed on the screens of respective devices. These devices may be graphically represented onscreen with icons that visually distinguish the user's device, the lead device and the other following devices. Another main aspect of this innovative technology is the ability to launch the tracking mode from within an instant message session, from a social networking platform or from within an e-mail thread. Another innovative aspect is the ability to initiate a conference call amongst the various devices. These and other novel features will be described in greater detail below.

Accordingly, an aspect of the present technology is a method of tracking a lead mobile device. The method entails receiving tracking data that includes a current location for both the lead mobile device and at least one other mobile device that is also tracking the lead device, and displaying the current locations of the lead device and of the at least one other mobile device that is also receiving the tracking data.

Another aspect of the present technology is a method of sharing tracking data with other mobile devices. The method entails activating a communication application, receiving user input to cause the mobile device to transmit tracking data to the plurality of other mobile devices, and communicating with a plurality of other mobile devices via the communication application.

Yet another aspect of the present technology is a computer readable medium that includes instructions in code that are adapted to perform the steps of the foregoing methods when the computer readable medium is loaded into memory and executed on a processor of a mobile device. Alternatively, the code could be loaded onto a server that is adapted to receive the raw device data from the lead mobile device, process the data to create useful tracking data and then transmit the processed data to the follower devices.

A further aspect of the present technology is a mobile device for tracking both a lead device and at least one other following device that is also tracking the lead device. The mobile device includes a positioning system for determining a current location of the mobile device, a memory operatively connected to a processor for interacting with a radiofrequency transceiver that receives tracking data that includes current locations of the lead device and of the at least one other following device, and a display screen for displaying the current locations of the mobile device, the lead device, and the at least one other following device.

Yet a further aspect of the present technology is a mobile device for sharing tracking data. The mobile device has a memory operatively connected to a processor for storing and executing a communication application, a radiofrequency transceiver for communicating with a plurality of other mobile devices via the communication application, a positioning subsystem for determining a current location of the mobile device from which the tracking data is generated, and a user input device for receiving user input from within the communication application that causes the mobile device to transmit the tracking data to the plurality of other mobile devices.

The details and particulars of these aspects of the technology will now be described below, by way of example, with reference to the attached drawings.

FIG. 1 is a schematic depiction of a wireless communications device as one example of a mobile device 100 on which the present technology can be implemented. It should be expressly understood that this figure is intentionally simplified to show only certain main components; the mobile device 100 of course may include other components beyond what are shown in FIG. 1. As depicted in FIG. 1, the mobile device 100 includes a microprocessor 110 (or simply a "processor") which interacts with memory in the form of random access memory (RAM) 120 and flash memory 130. The mobile device includes one or more input/output devices or user interfaces 140, such as a display screen 150 (e.g. a small LCD screen or touch-sensitive display screen), a keyboard/keypad 155, thumbwheel/trackball/trackpad 160, a USB or serial port for connecting to peripheral equipment.

Where the mobile device is a wireless communications device, it may further include a radiofrequency (RF) transceiver 170 for communicating wirelessly with one or more base stations and optionally also a short-range transceiver e.g. Bluetooth®.

For telephony, the mobile device may include a microphone 180 and a speaker 182.

The mobile device 100 may also include a positioning system such as a Global Positioning System (GPS) receiver (chipset) 190 for receiving GPS radio signals transmitted from one or more orbiting GPS satellites 192.

The processor and memory cooperate to execute applications on the device such as, for example, a map or navigation application. The map or navigation application interacts with the GPS receiver by mapping GPS position coordinates so as to graphically display the current location of a device. As will be detailed below, the navigation application plots not only the current location of the user's device and of the lead device but also the current location of at least one of device that is also following the lead device. The navigation application thus enables tracking of the lead device by multiple followers. This tracking mode or "follow me" mode can be triggered or initiated in various ways, as will be described in detail below.

Figure 2:
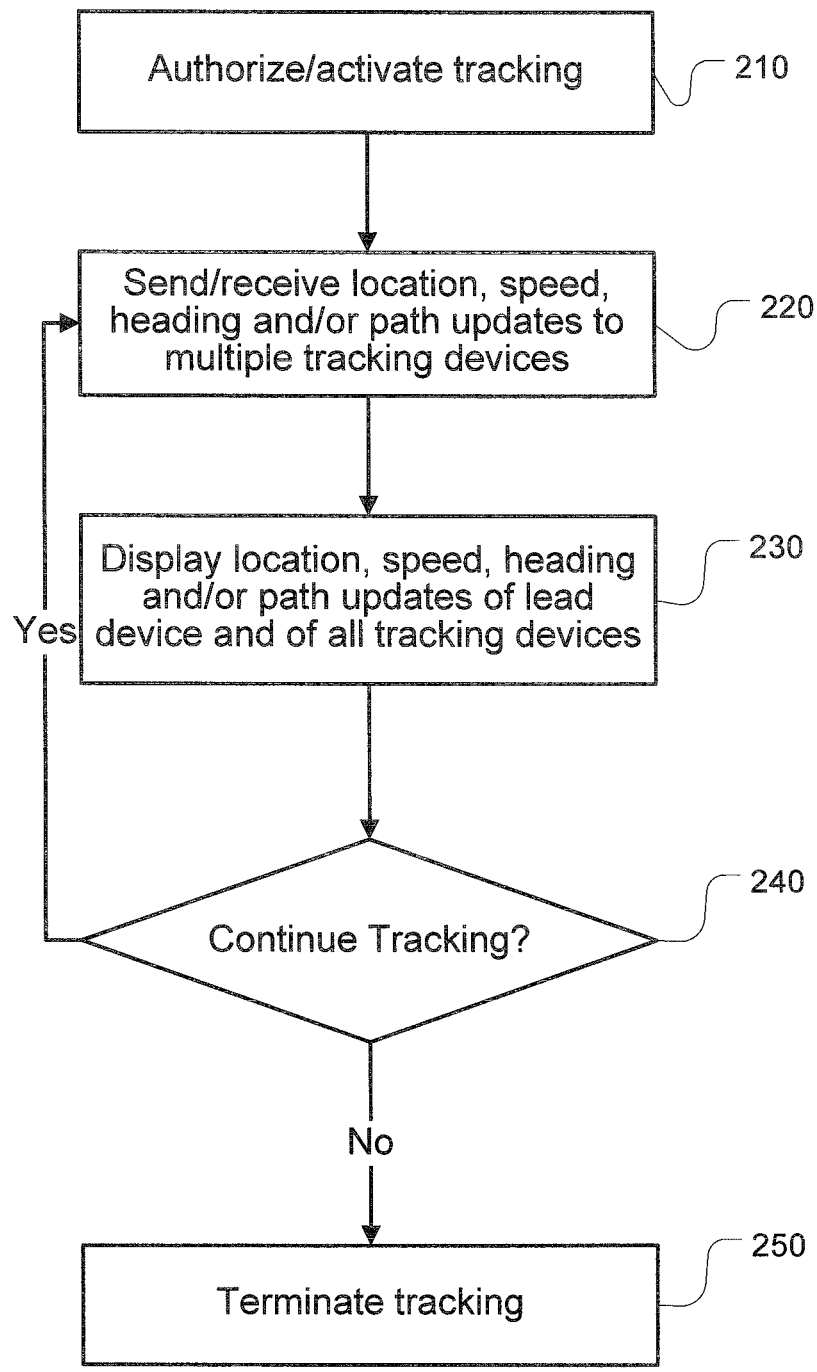
FIG. 2 is a flowchart outlining main steps of a tracking method in which a lead device shares its location, speed, heading and/or path data with multiple tracking devices.

FIG. 2 is a flowchart outlining main steps of a tracking method in which a lead device shares its location, speed, heading and/or path data with multiple tracking devices. In an initial step 210, tracking of one device by another is initiated (i.e. authorized or otherwise activated). Tracking mode ("follow me" mode) may be activated either by the first device (lead device) or by the second device (one of the followers). Activation may be done either manually or automatically. Automatic triggering of tracking mode can be done using a proximity detection subsystem (short-range wireless proximity detector) that detects when one device has strayed away from another device with which it has been paired. Bluetooth® proximity detection can be used to accomplish this efficiently. When one Bluetooth® device strays away from its paired device, then connectivity is lost, which can thus be used to automatically trigger the activation of tracking/follow-me mode.

Still referring to FIG. 2, upon activation at step 210, the device then generates or collects tracking data (or retrieves this data from a local cache or remotely from a server). This tracking data includes the current location of the lead device. The tracking data may also include one or more of speed, heading and path. At step 220, this tracking data is then transmitted, broadcast or otherwise sent to multiple tracking devices, either directly or indirectly, as will be elaborated below. Step 220 may also include receiving tracking data from other devices either from followers or the lead device.

At step 230, the location, speed, heading and/or path updates of the lead device, the user's device and at least one other tracking device are plotted onscreen, e.g. on a map. The tracking mode may persist until deactivated by either the user or the lead device (in a consensual tracking paradigm). At step 240, the device queries whether tracking is to continue. If so, further location, speed, heading and/or path updates are sent. If not, tracking is terminated at step 250.

Figure 3:
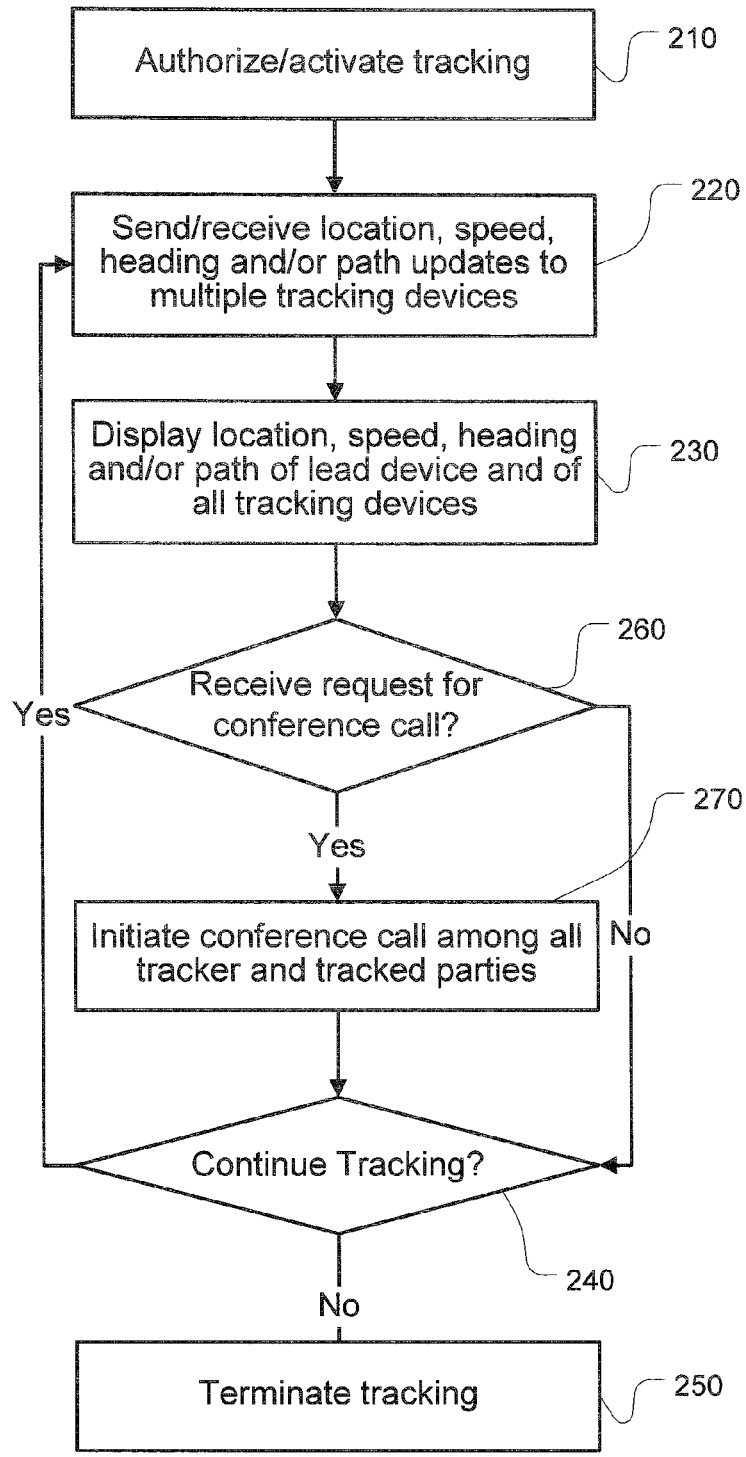
FIG. 3 is a flowchart outlining main steps of a novel tracking method in which the parties may initiate a conference call.

FIG. 3 is a flowchart outlining main steps of a novel tracking method in which one of the parties (either lead device user or one of the followers) may initiate a conference call during tracking mode, i.e. while the tracking data is being shared. The flowchart is, in some respects, similar to that of FIG. 2: after the activation step 210, tracking data (location, speed, path, heading) is shared with the follower devices at step 220 for display (step 230) on mobile devices. In this implementation, the mobile devices are configured to recognize a request to initiate a conference call (step 260). Upon receipt of such a request, the mobile device initiates a conference call (step 270). Where no such request is received, operations proceed to step 240 as before.

Figure 4:
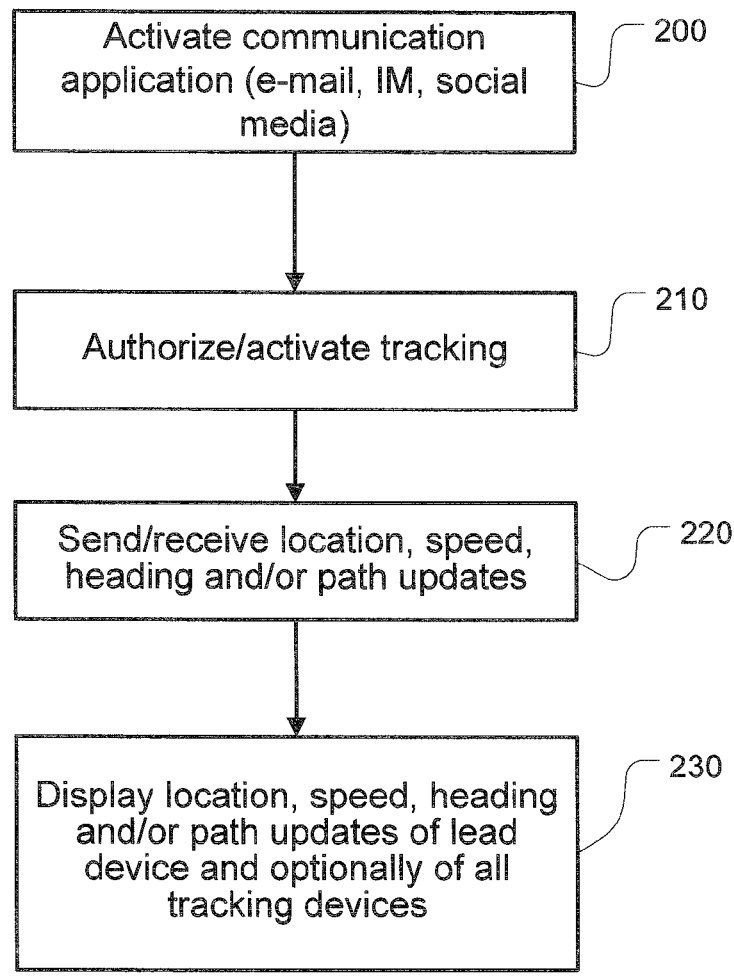
FIG. 4 is a flowchart outlining main steps of a novel tracking method in which tracking is initiated from a communication application such as e-mail, instant messaging or a social media application.

FIG. 4 is a flowchart outlining main steps of a novel tracking method in which tracking is initiated from a communication application such as e-mail, instant messaging or a social media application. At step 200, the user activates a communication application. For the purposes of this specification, a communication application is meant to include an e-mail application, an instant messaging application or any other text messaging such as MMS, SMS, etc. A communication application is also meant to encompass a social networking application that interacts with a social networking platform or site. Step 210 of activating the tracking mode can be performed from within the communication application.

For example, tracking may be initiated from within an e-mail application. For example, a hyperlink within an e-mail message (or e-mail thread) may be used to initiate tracking. Alternatively, any button, menu item or other user interface element within an e-mail application may be provided to trigger tracking.

Similarly, tracking may be initiated from within an instant messaging application. Any suitable user interface element within an instant messaging application may be provided to enable a user to initiate tracking while in the midst of an instant messaging (IM) session, i.e. without having to exit from the IM session and launch a separate application.

Tracking may also be initiated from within a social networking platform or application.

Once activated, the tracking mode performs steps 220 and 230 (as described above).

In one variant, the tracking mode may also be terminated from within the communication application (not just activated/initiated).

Figure 5:
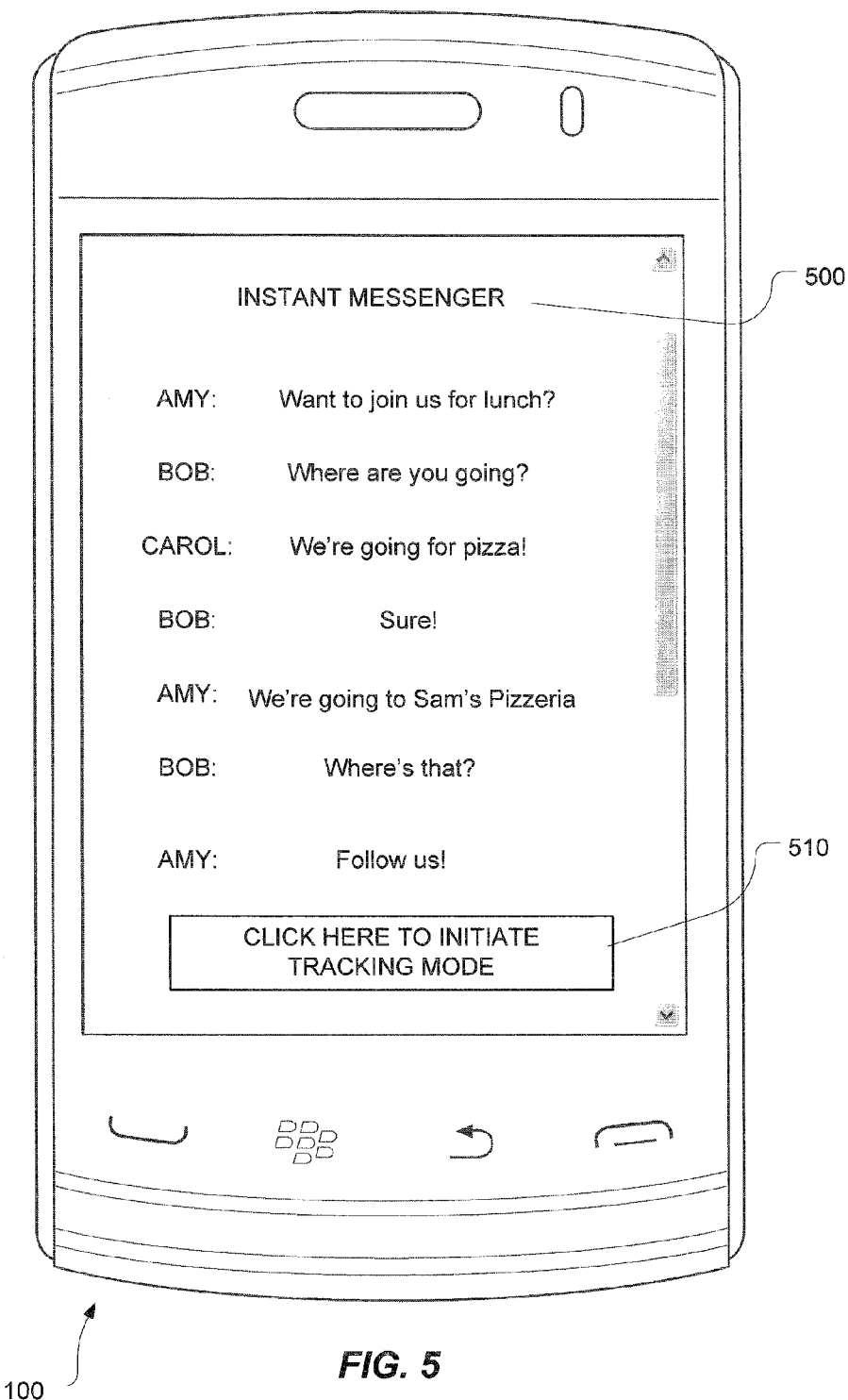
FIG. 5 depicts an example of a mobile device executing an instant messenger application, the user interface of which displays a touch-sensitive user interface element to initiate tracking.

FIG. 5 depicts an example of a mobile device 100 executing an instant messenger application. The user interface 500 displays a touch-sensitive user interface element 510 to initiate tracking. In this example, by clicking on the virtual (touch-sensitive) button 510, tracking mode is initiated whereby Amy's device (the lead device) provides tracking data to Bob's device and Carol's device.

Figure 6:
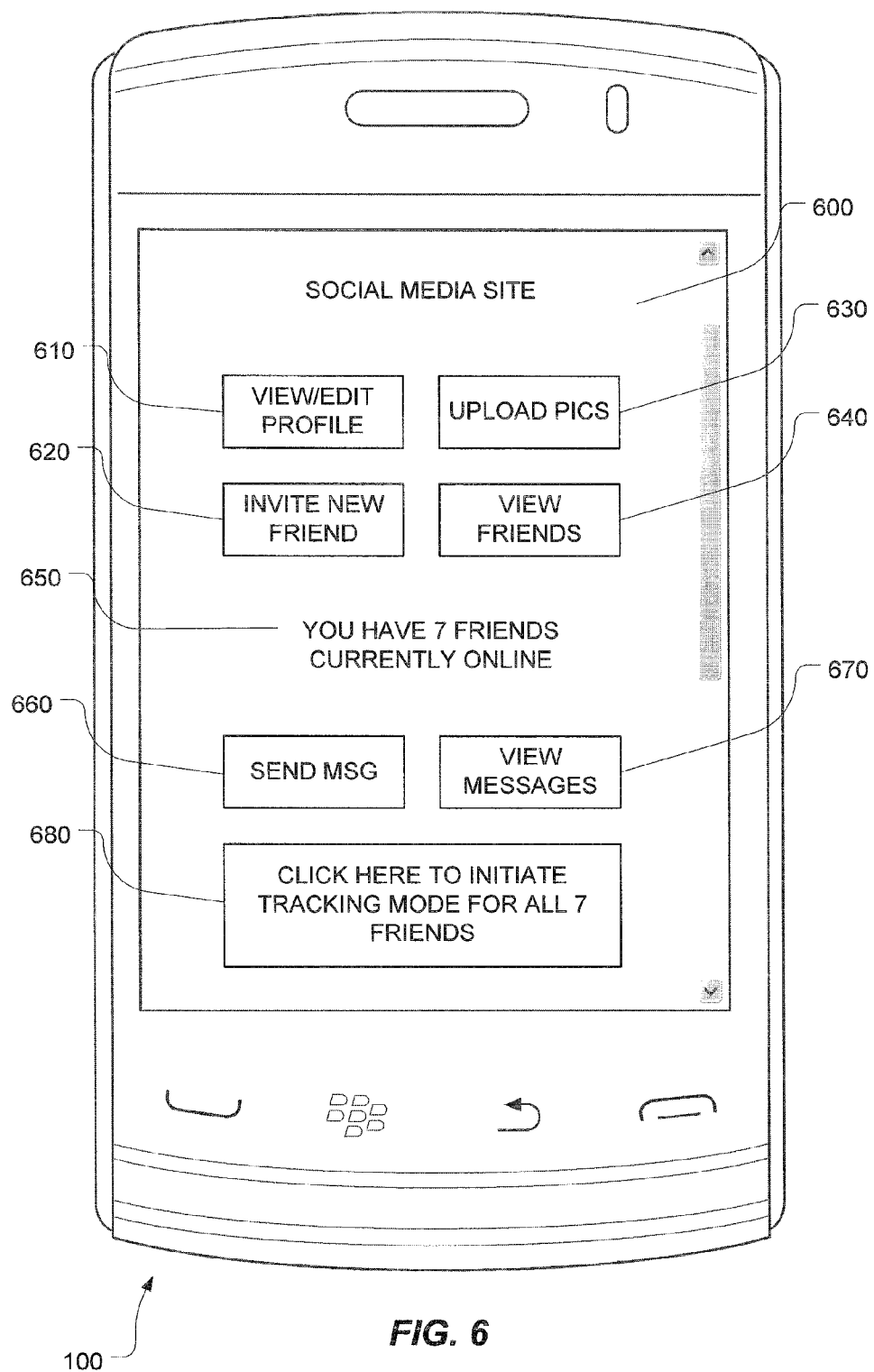
FIG. 6 depicts an example of a mobile device executing a social media application, the user interface of which displays a touch-sensitive user interface element to initiate tracking.

FIG. 6 depicts an example of a mobile device 100 executing a social media application. The user interface 600 displays, by way of example only, a number of different user interface elements (virtual buttons) that enable the user to interact with the social networking platform. These include by way of example a button 610 to view or edit one's profile, a button 620 to invite a new friend, a button 630 to upload pictures, a button 640 to view a list of one's friends, a virtual display panel 650 to present how many friends (contacts) are currently online, a button 660 to send a message to one or more friends, and a button 670 to view messages received. In addition, the user interface presents a touch-sensitive user interface element 680 to initiate tracking. In this example, the button triggers a tracking mode in which tracking data is disseminated to all (seven) friends currently online. The device may be configurable to determine the identity of the recipients of the tracking data, e.g. the device may permit the user to individually select the friends who are to receive the tracking data, to select a subset of the friends online, or to select recipients based on recent messaging events. These settings may be configured using a settings or options page.

Figure 7:
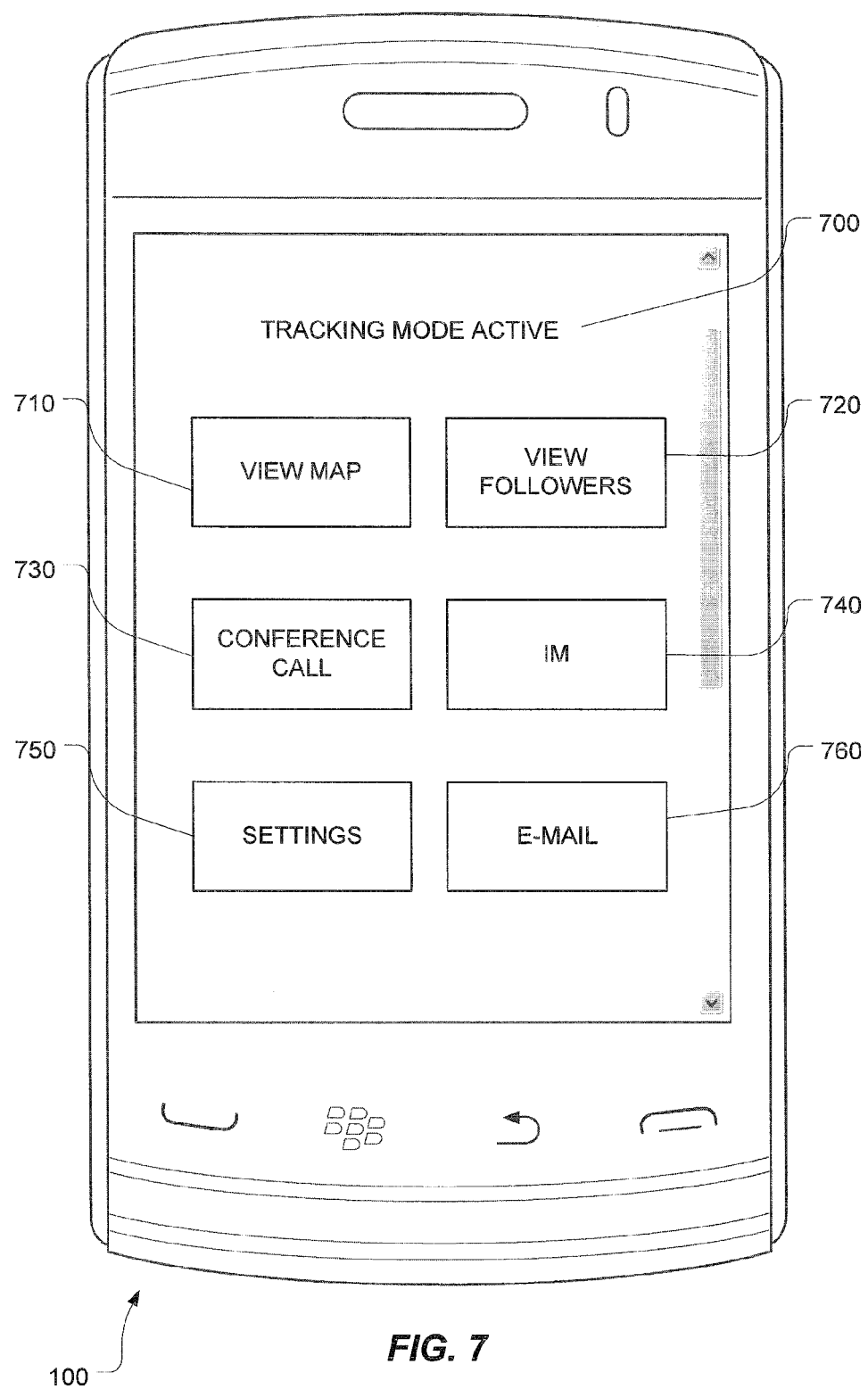
FIG. 7 depicts an example of a user interface for a tracking application that provides various options to the user for managing the tracking mode.

FIG. 7 depicts an example of a user interface 700 for a tracking application that provides various options to the user for managing the tracking mode. By way of example, the user interface 700 may present an indication whether the tracking mode is active. In addition, the tracking application may present user interface elements (e.g. virtual buttons) to view map (710), view followers (720), initiate a conference call (730), initiate an instant messaging (IM) session (740) with the devices exchanging tracking data, configure tracking mode settings (750) or send an e-mail message to the other devices sharing the tracking data (760).

Figure 8:
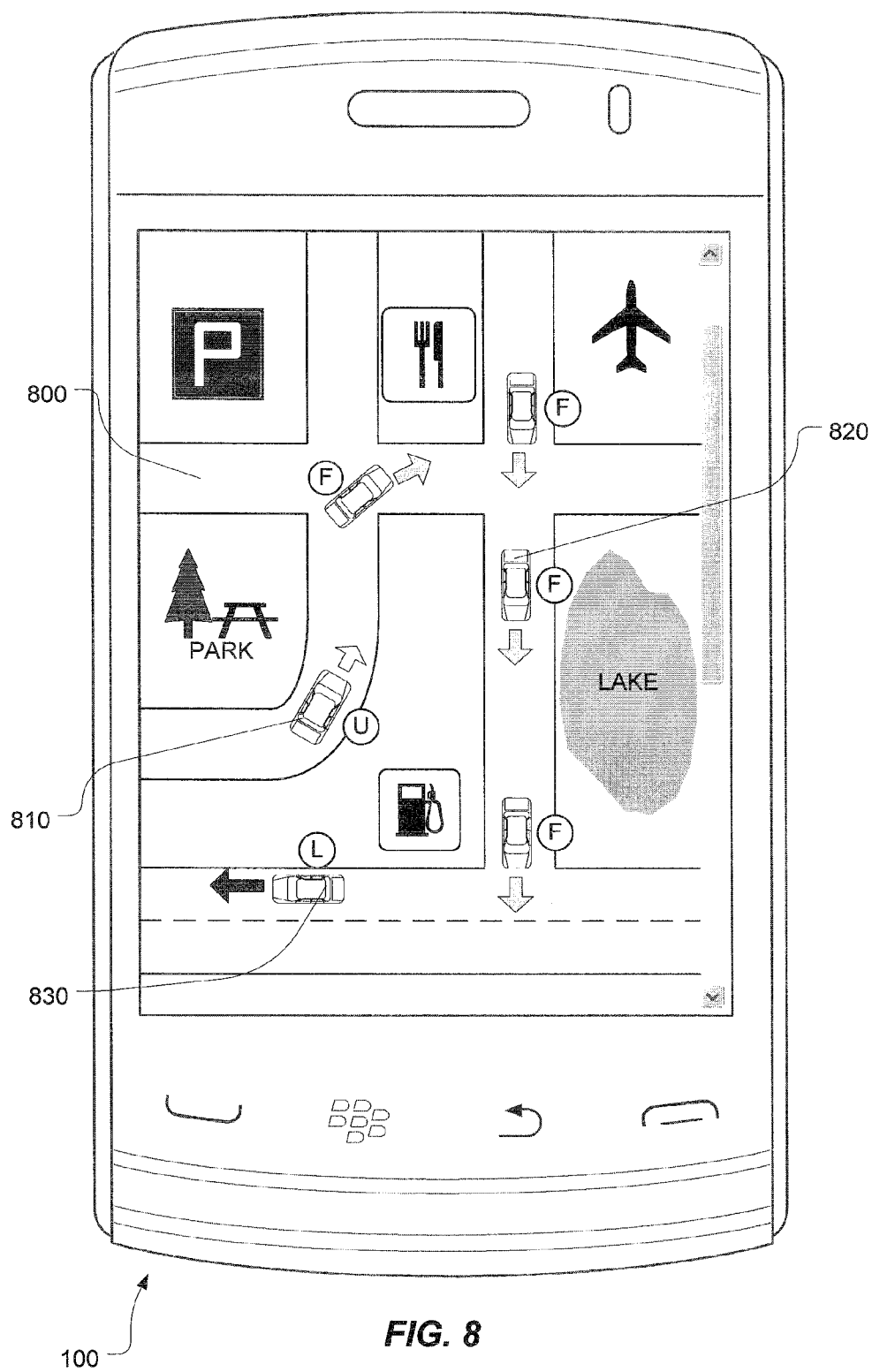
FIG. 8 depicts an example of a mobile device displaying a map that shows the user's device, the lead device, and all the other devices that are also following the lead device.

FIG. 8 depicts an example of a mobile device 100 displaying a map that shows the user's device 810, the lead device 830, and all the other devices 820 that are also following the lead device 830.

In this example, the icons are arbitrarily shows as cars but any other suitable icon or graphical representation may be employed. In one specific implementation, the tracking application (or navigation application) may automatically alter the type of icon based on the speed data. If the speeds of the device are in a certain range, the device may infer that the device is in a car. If the speeds of the device are in another (lower) range, the device may infer the user of the device is walking, in which case the car icon may automatically be replaced with a stick figure or icon resembling a person.

As depicted in FIG. 8, the onscreen icons representing each of the devices may be presented so as to visually distinguish the lead device from the followers. Similarly, it may be helpful to visually distinguish the user's device from the other followers. In this specific example, the lead device is visually distinguished with the letter L in a circle whereas the user's device is visually distinguished with the letter U in a circle. The other followers are visually distinguished with the letter F in a circle. The circled letters are shown solely as an example. In addition to, or in lieu of, the circled letter designations, the icons may have different shapes, colors, names, symbols, shading or shadowing to visually distinguish the various devices onscreen.

In addition to, or in lieu of, the icons being plotted at their respective current locations, the device may also display speed or velocity vectors (speed plus direction), direction/heading arrows, and/or dashed-line path traces to enrich the information being conveyed to the tracker. Time data may also be optionally presented to indicate how fresh the tracking data is. For example, a black arrow may be provided to show the lead device's current heading. The length of the arrow may be proportionate to the current speed. In this example, the direction/heading arrows for the follower devices are shaded grey whereas the direction/heading arrow for the user device is white.

Figure 9:
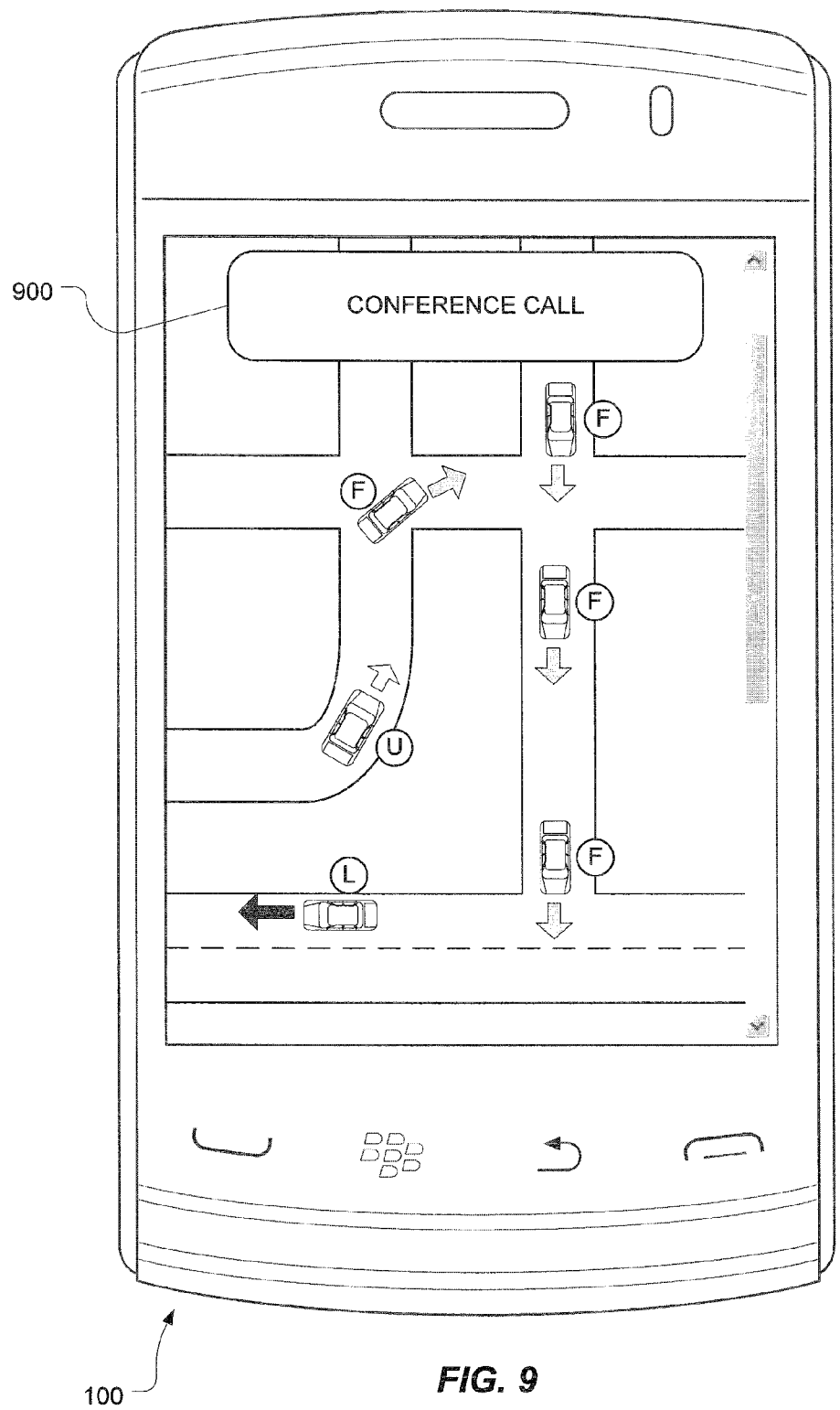
FIG. 9 depicts a variant of the user interface shown in FIG. 8 in which the user interface further presents a user interface element for initiating a conference call.

FIG. 9 depicts a variant of the user interface shown in FIG. 8 in which the user interface further presents a user interface element 900 for initiating a conference call. The conference call button may be floating so that it is moved to a place onscreen where it does not obstruct the view of the icons. Alternatively, the conference call button may be displayed only when a user taps the screen or performs a certain predetermined gesture. Alternatively, the conference call button may be automatically displayed when a triggering event occurs, e.g. when the lead device has strayed too far ahead of the following devices, i.e. when the distance between the lead device and the following devices exceeds a predetermined threshold.

Figure 10:
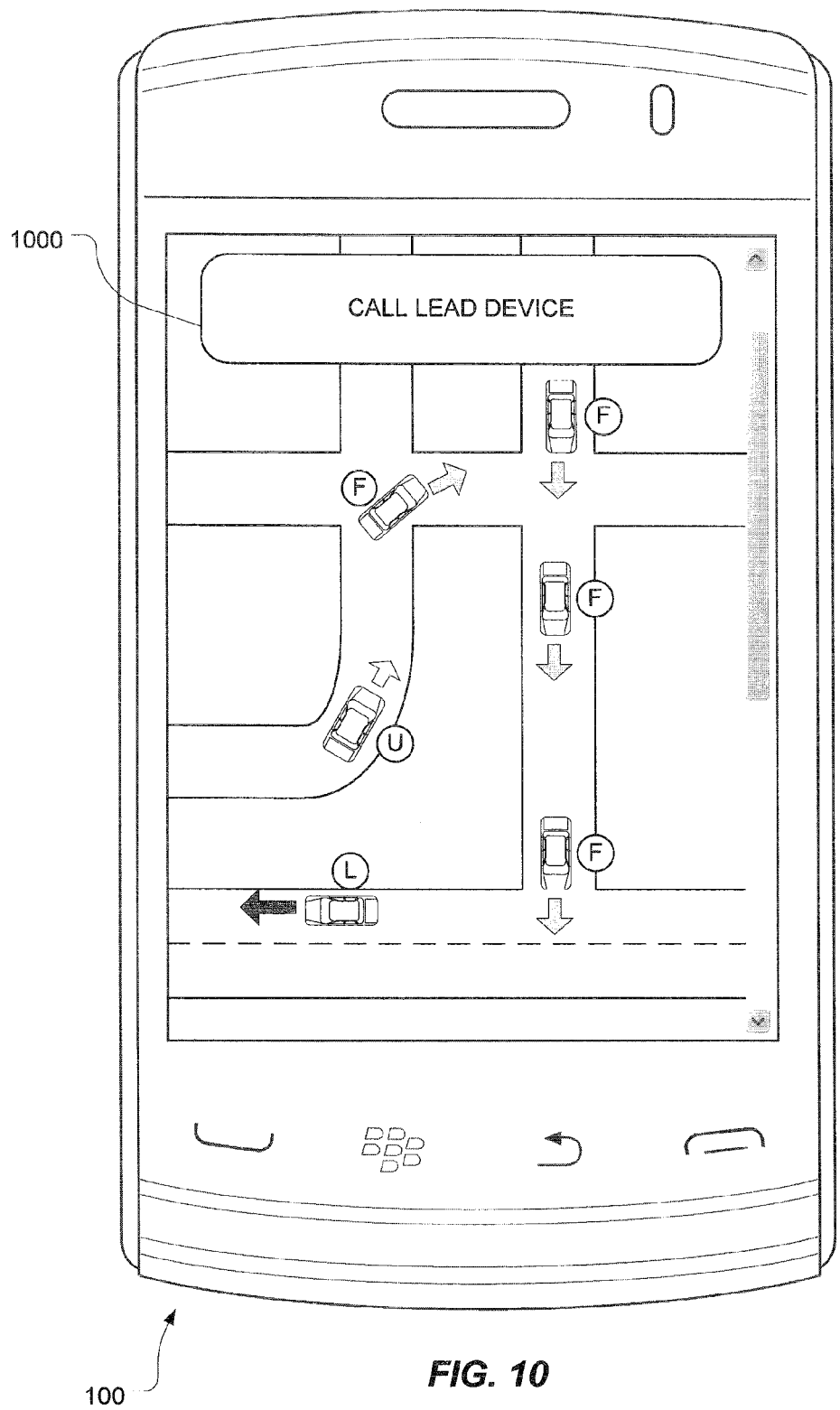
FIG. 10 depicts a variant of the user interface shown in FIG. 8 in which the user interface further presents a user interface element for calling only the lead device.

FIG. 10 depicts a variant of the user interface shown in FIG. 8 in which the user interface (on the user device that is tracking the lead device) further presents a user interface element 1000 for calling only the lead device.

In a variant of the implementations presented in FIG. 9 and FIG. 10, the mobile device may be configured to receive voice commands for "hands-free" calling (instead of requiring onscreen user input). This can be achieved, for example, by integrating a Bluetooth® car-kit with a voice-activated dialing capability.

Figure 11:
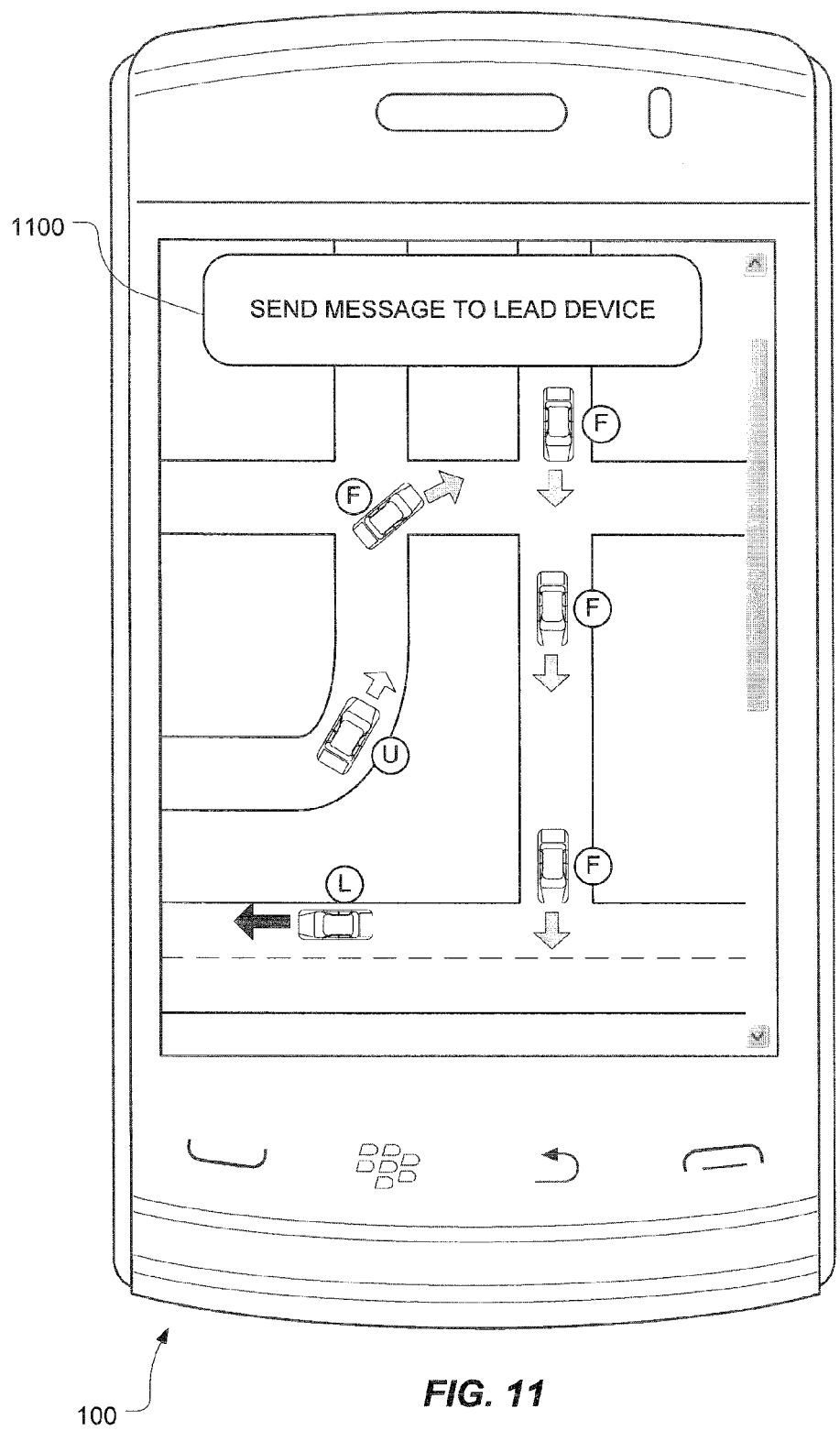
FIG. 11 depicts a variant of the user interface shown in FIG. 8 in which the user interface further presents a user interface element for sending a message to the lead device.

FIG. 11 depicts a variant of the user interface shown in FIG. 8 in which the user interface (on the user device that is tracking the lead device) further presents a user interface element 1100 for sending a message to the lead device. In a variant, the button may enable sending of a message to the lead device and all other followers. On the lead device's user interface, this button would be replaced with a button to send a message to one or more of the followers.

For FIG. 10 and FIG. 11, the buttons may float around on the screen (i.e. be displaced to avoid obstructing the view of the icons) or it may be displayed only when a certain gesture or input is received. Alternatively, as noted above, it may appear automatically when a certain event occurs, e.g. the distance between the lead device and the user's device exceeds a predetermined threshold.

Figure 12:
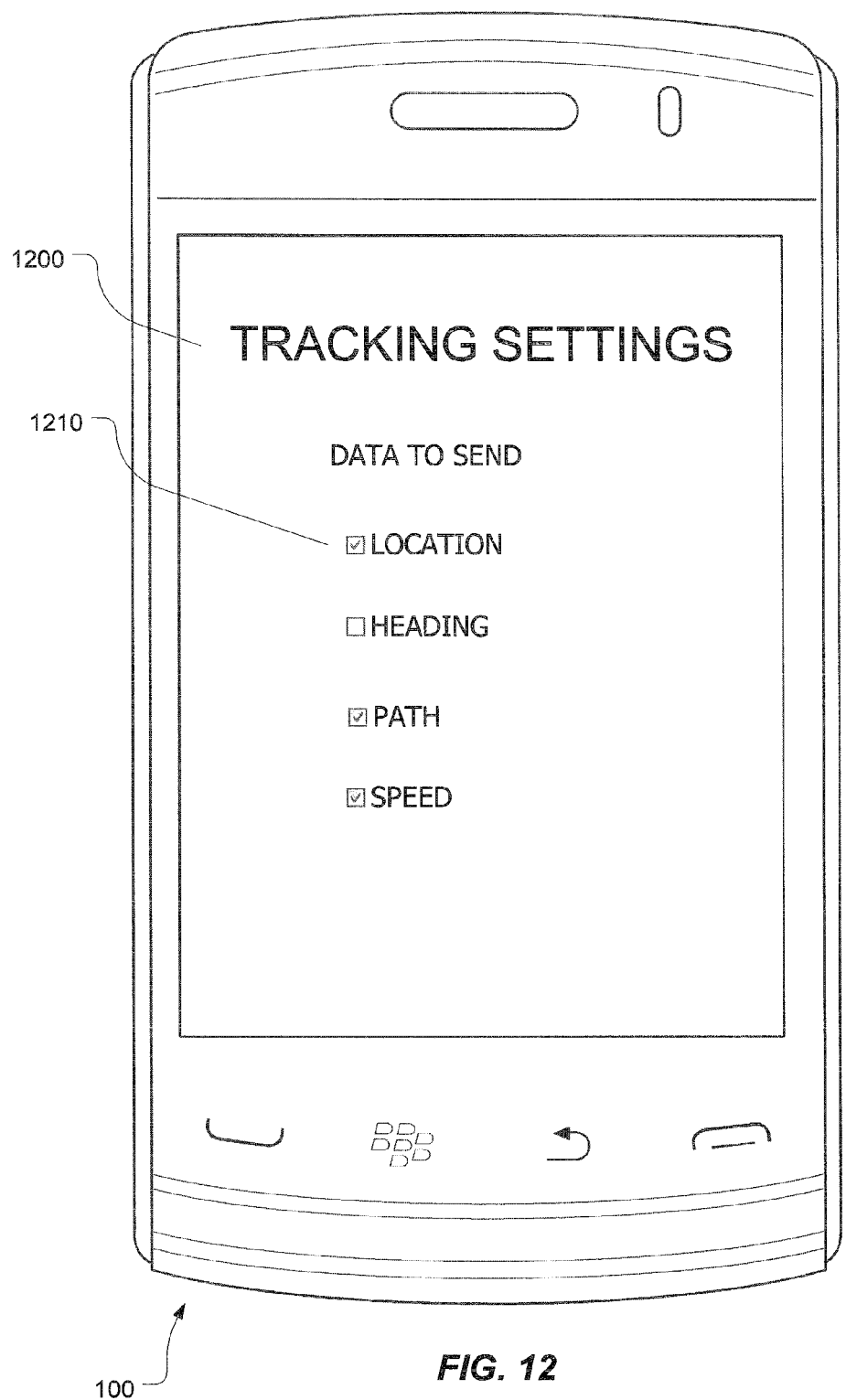
FIG. 12 depicts an example of an options/settings page within the tracking application that enables the user to determine which types of data to collect and/or transmit.

FIG. 12 depicts an example of an options/settings page 1200 within the tracking application that enables the user to determine which types of data to collect and/or transmit. The user interface may, for example, have a series of tick boxes 1210, toggles or other interface elements. As shown by way of example in this figure, the user may specify, for example, that the device is only to send location data, path data and speed data but not heading data.

Figure 13:
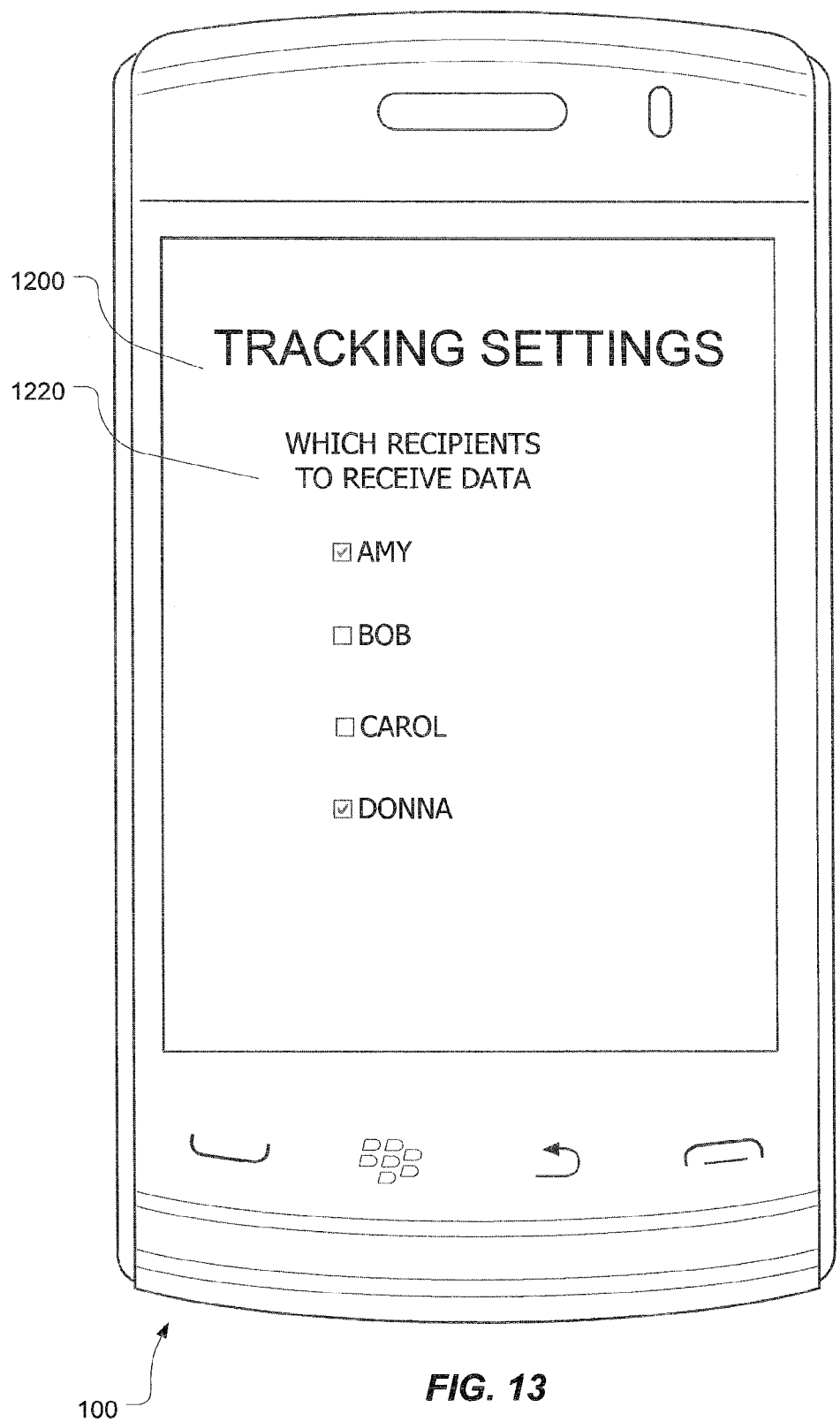
FIG. 13 depicts an example of another options/settings page within the tracking application that enables the user to specify which friends or contacts are to receive the tracking data.

FIG. 13 depicts an example of another options/settings page 1200 within the tracking application that enables the user to specify which friends or contacts are to receive the tracking data. For example, the screen or options page 1200 may present various tick boxes 1220 beside the names of potential recipients. In a variant, the identity of the recipients may be automatically controlled and varied by the device. For example, a short-range wireless proximity detector may trigger tracking mode for those devices that have lost wireless connection. Tracking for specific followers can thus be activated and deactivated as the distance between the lead device and its followers varies.

Figure 14:
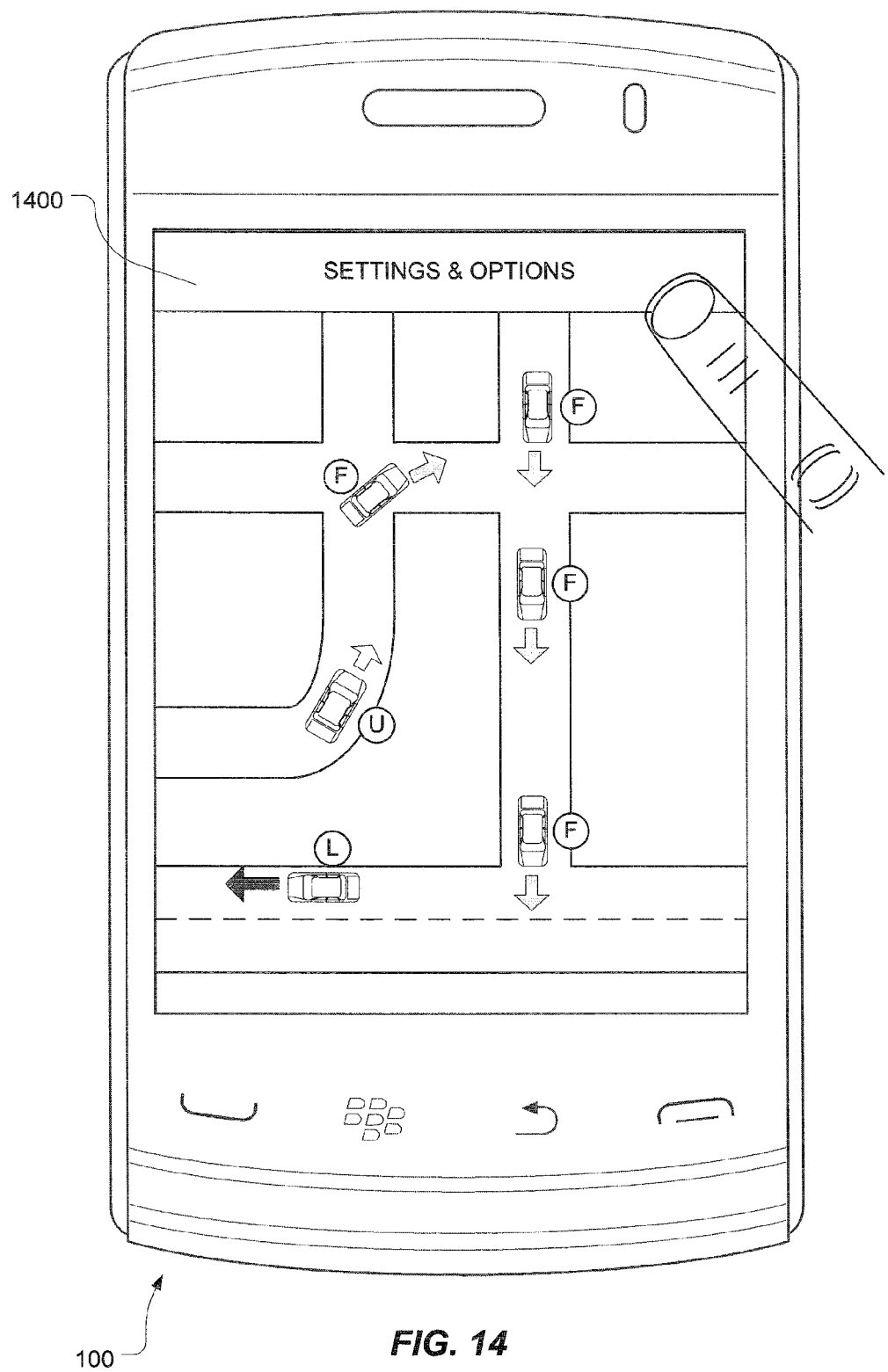
FIG. 14 depicts an example of a mobile device displaying a map showing the relative locations of the lead device, the user's device and the other following devices, the user interface also displaying a touch-sensitive settings and options button to enable the user to configure and customize the tracking application.

FIG. 14 depicts an example of a mobile device 100 displaying a map showing the relative locations of the lead device (L), the user's device (U) and the other following devices (F). The user interface also displays a touch-sensitive settings and options button 1400 to enable the user to configure and customize the tracking application.

Figure 15:
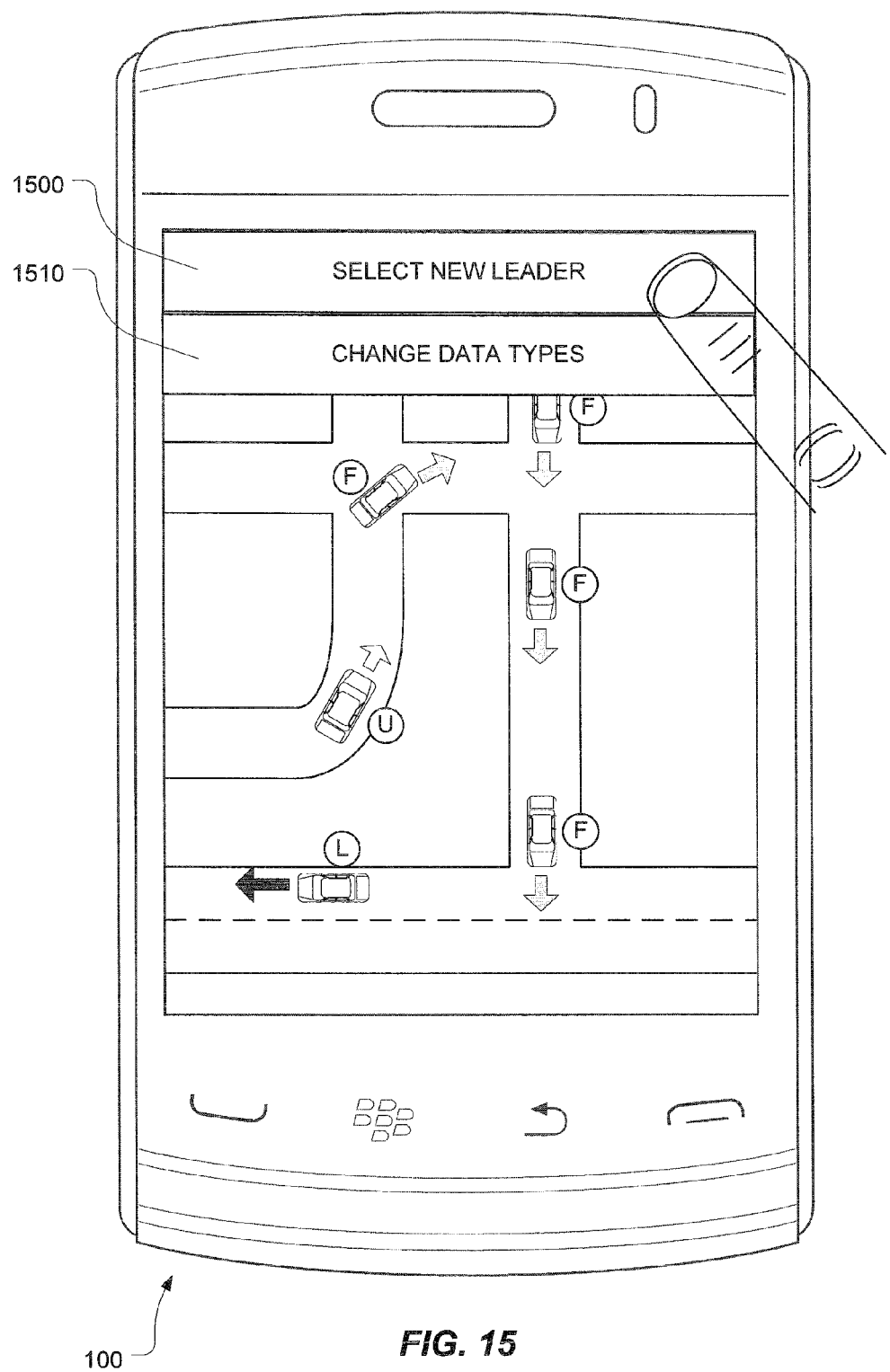
FIG. 15 depicts an example of the user interface of FIG. 14 after the user has touched the settings and options button to reveal further options including an option to select a new leader.

FIG. 15 depicts an example of the user interface of FIG. 14 after the user has touched the settings and options button (shown in FIG. 14) to reveal further options including an option/button 1500 to select a new leader and a further option/button 1510 to change data types. Changing data types 1510 may bring up a settings/preferences page such as the one depicted by way of example in FIG. 12. Selection of a new leader enables the user to pick a different vehicle as the vehicle he or she wishes to follow henceforth.

Figure 16:
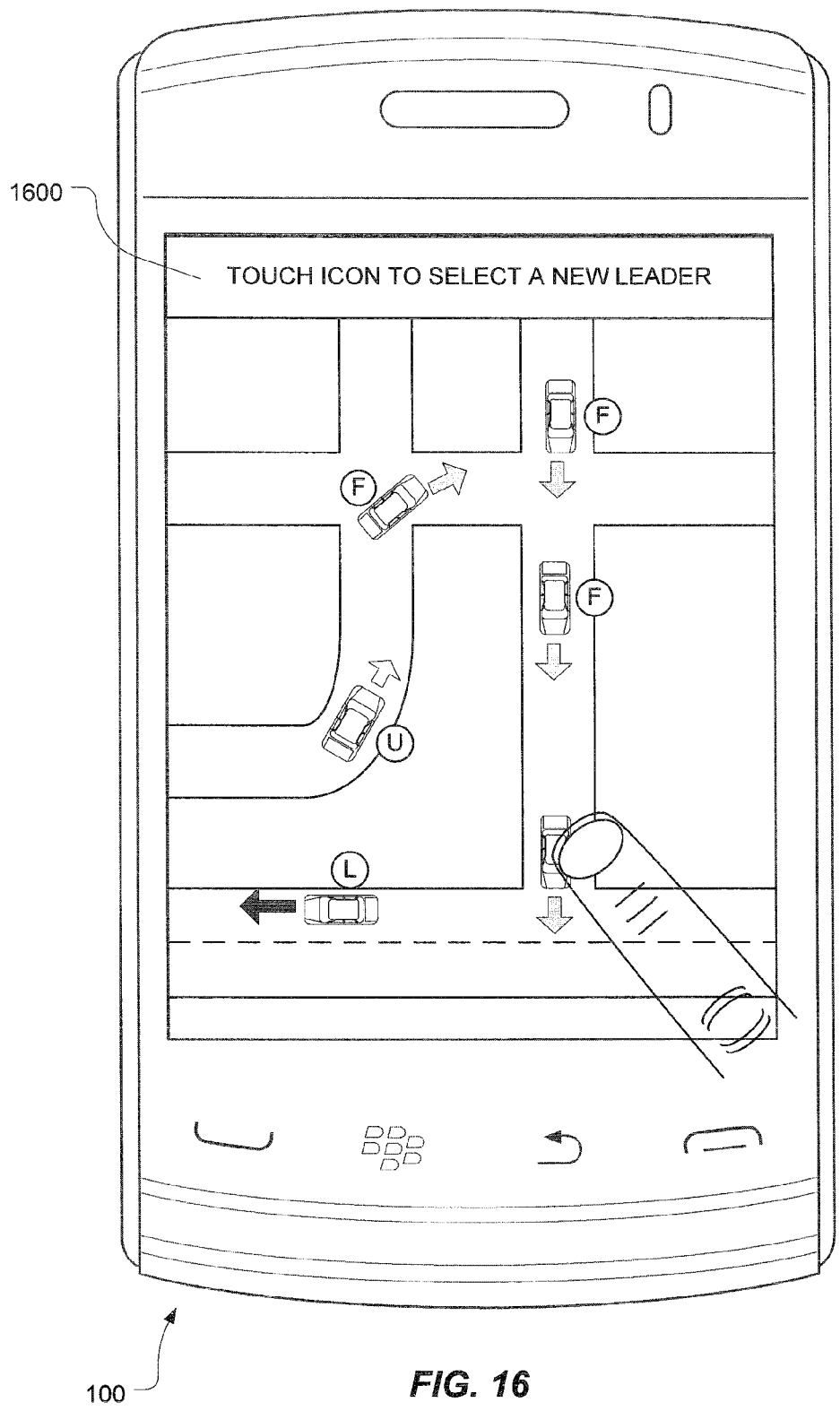
FIG. 16 depicts an example of the user interface of FIG. 15 after the user has selected the option to select a new leader in which case the user may touch any of the icons onscreen to select the new leader.

FIG. 16 depicts an example of the user interface of FIG. 15 after the user has touched the option button 1500 (shown in FIG. 15) to select a new leader. As shown in FIG. 16, the user interface may present instructions onscreen to touch the icon corresponding to the vehicle or device that the user wishes to designate as the new leader. As shown in FIG. 16, the user then touches any of the car icons corresponding to the other followers (F) displayed onscreen to select this follower as the new leader. Optionally, the display may be refreshed to show the highlighted selection. In a variant, the selection may be made using voice commands.

Figure 17:
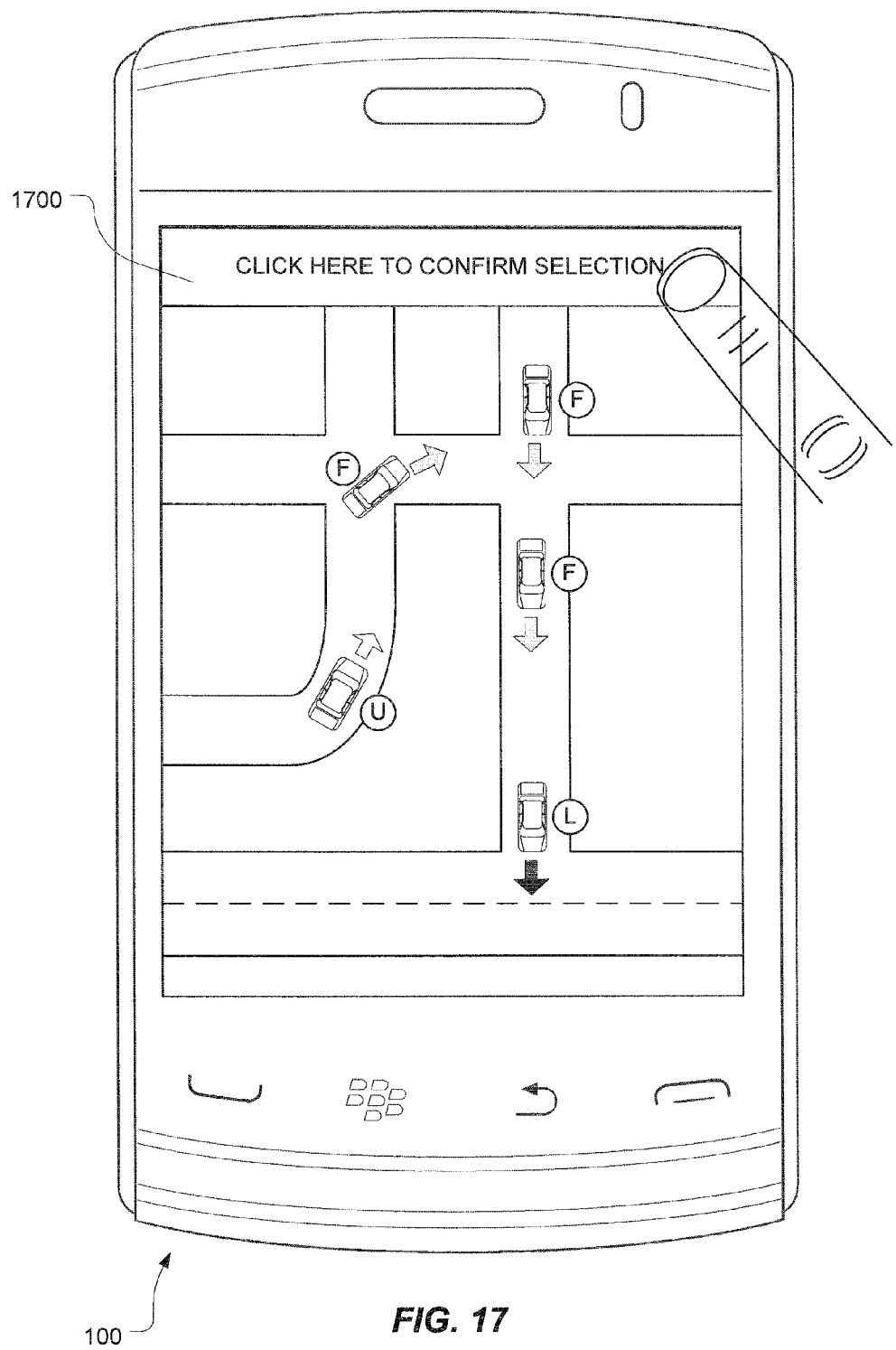
FIG. 17 depicts an example of the user interface of FIG. 16 after selection of a new leader in which case the device requests that the user confirm this selection.

FIG. 17 depicts an example of the user interface of FIG. 16 after selection of the new leader. The device then requests that the user confirm this selection by pressing confirmation button 1700. The display may then be refreshed to show the newly selected vehicle as the new leader. By way of example, the icon is relabeled as the leader with the L in the circle. The directional arrow (or velocity vector) is colored black. The previous leader icon may be removed from the map view as shown by way of example in FIG. 17 or, alternatively, the previous leader icon may still be shown with a different designation/symbol/label or no designation/symbol/label at all.

In one implementation, the scale (or zoom level) may be dynamically altered when the lead device (or lead vehicle) and the follower device (or follower vehicle) becomes separated by more than a predetermined distance. This automatic re-zooming ensures that both the lead device and the follower are visible on the same onscreen map.

A variant on the re-zooming implementation is a split-screen map view that is displayed when the lead device becomes separated by more than a predetermined distance. In the split-screen map view, one half of the screen displays the area in which the lead vehicle is currently traveling while a second half of the screen displays the area in which the follower is currently traveling. This makes it easier for the user to track the lead device.

In another implementation, the mapping application may highlight what it believes to be the correct (or best or fastest) route to follow for the user to connect or catch up with the lead car. Highlighting the route may be accomplished by overlaying a semi-transparent coloured line along the route.

Figure 18:
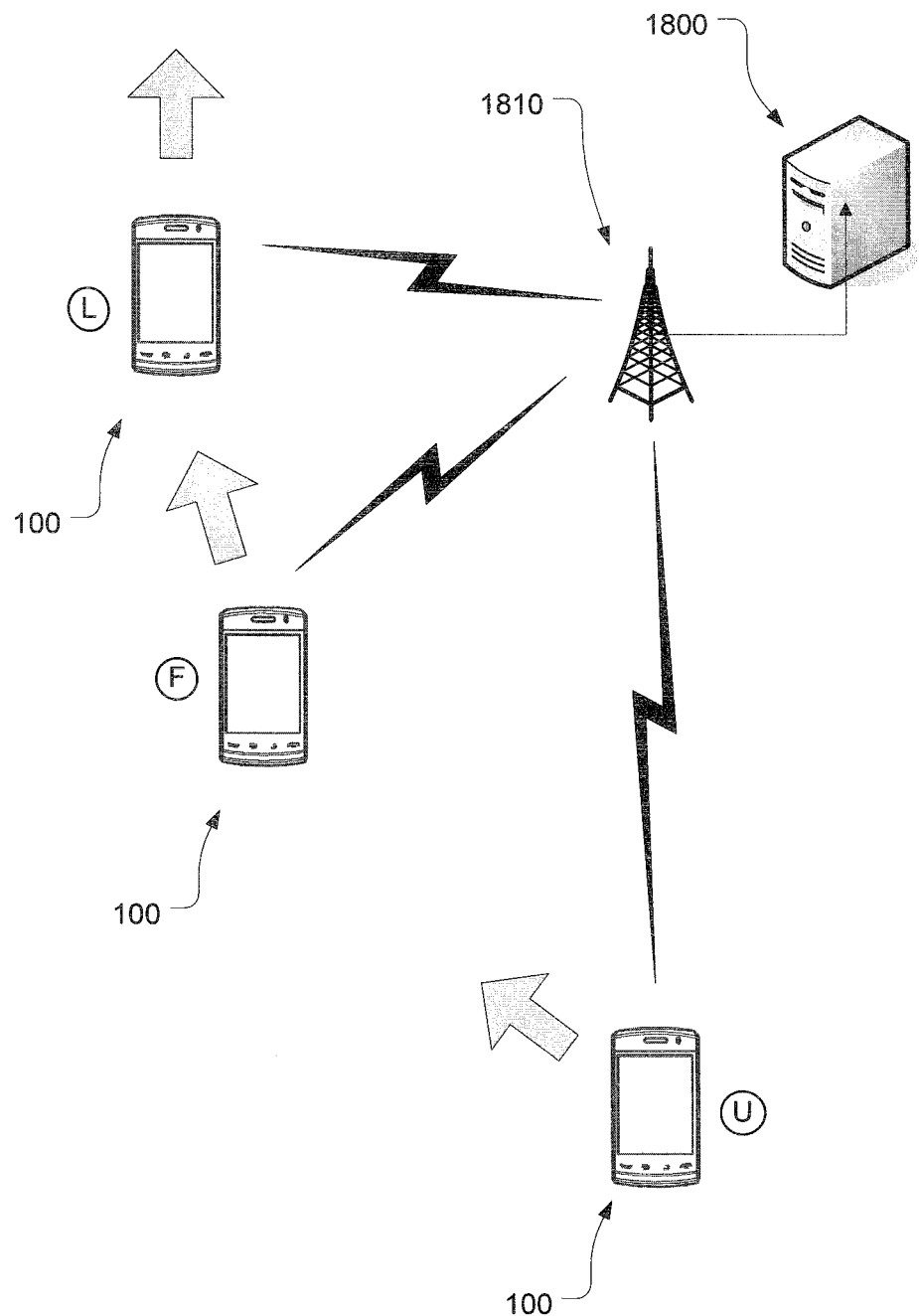
FIG. 18 depicts a tracking method in which a server receives the location, speed, heading and/or path data from the lead device and disseminates this data to the tracking devices.

As alluded to above, the transmission of tracking data to the follower devices may be done directly or indirectly. In a classic client-server paradigm, devices share data indirectly through the intermediary of a server. In this model, each device generates its own location data, speed data, path data and heading data by determining location, speed, path, and heading using its own onboard GPS chip or other positioning system (and/or by using other sensors like an accelerometer, compass, etc.). The data for each device is then transmitted wirelessly by the device to a server which then disseminates this data to the other devices. Each device thus receives location, speed, path and/or heading data for all of the other devices in the group or convoy. Each device can thus present this data graphically on its own display screen. FIG. 18 depicts a simplified schematic of the foregoing indirect paradigm for sharing tracking data in which a server receives the location, speed, heading and/or path data from the lead device and disseminates this data to the tracking devices. As noted above, the follower devices also contribute their location data in the same manner (via the server). A further refinement to the implementation depicted in FIG. 18 would entail encrypting the position data sent to the central server so that only the peers participating in the "follow me" group can see each other. This should alleviate any privacy concerns, especially for users sharing data through a third-party (e.g. non-corporate or "non-BES") system.

Figure 19:
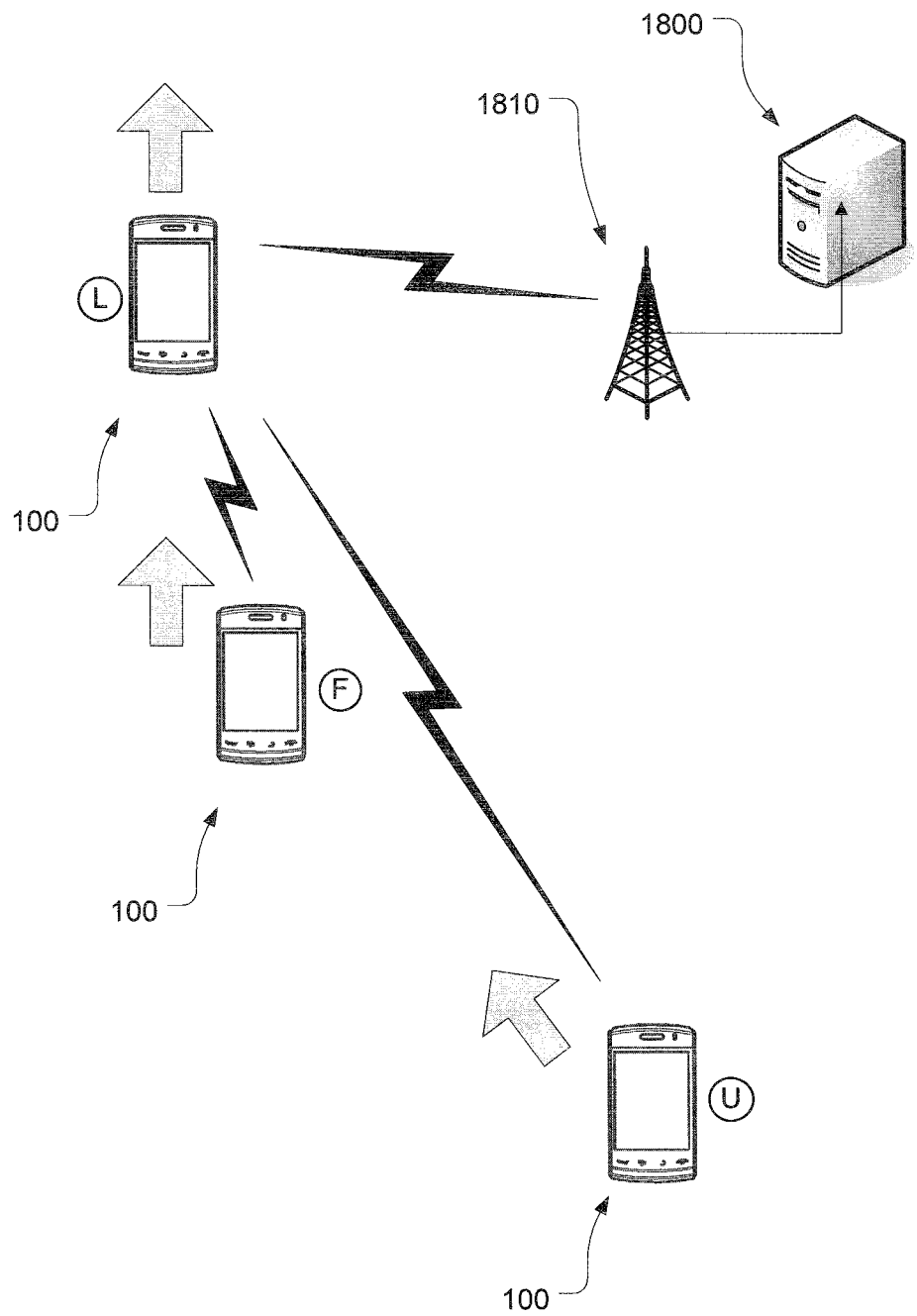
FIG. 19 depicts a peer-to-peer tracking method in which the lead device broadcasts tracking data directly to the tracking devices.

In contrast, in a peer-to-peer paradigm, tracking data is disseminated directly. FIG. 19 depicts a peer-to-peer tracking method in which the lead device broadcasts tracking data directly to the followers (tracking devices). The lead device may communicate with the followers using a short-range wireless transceiver.

Figure 20:
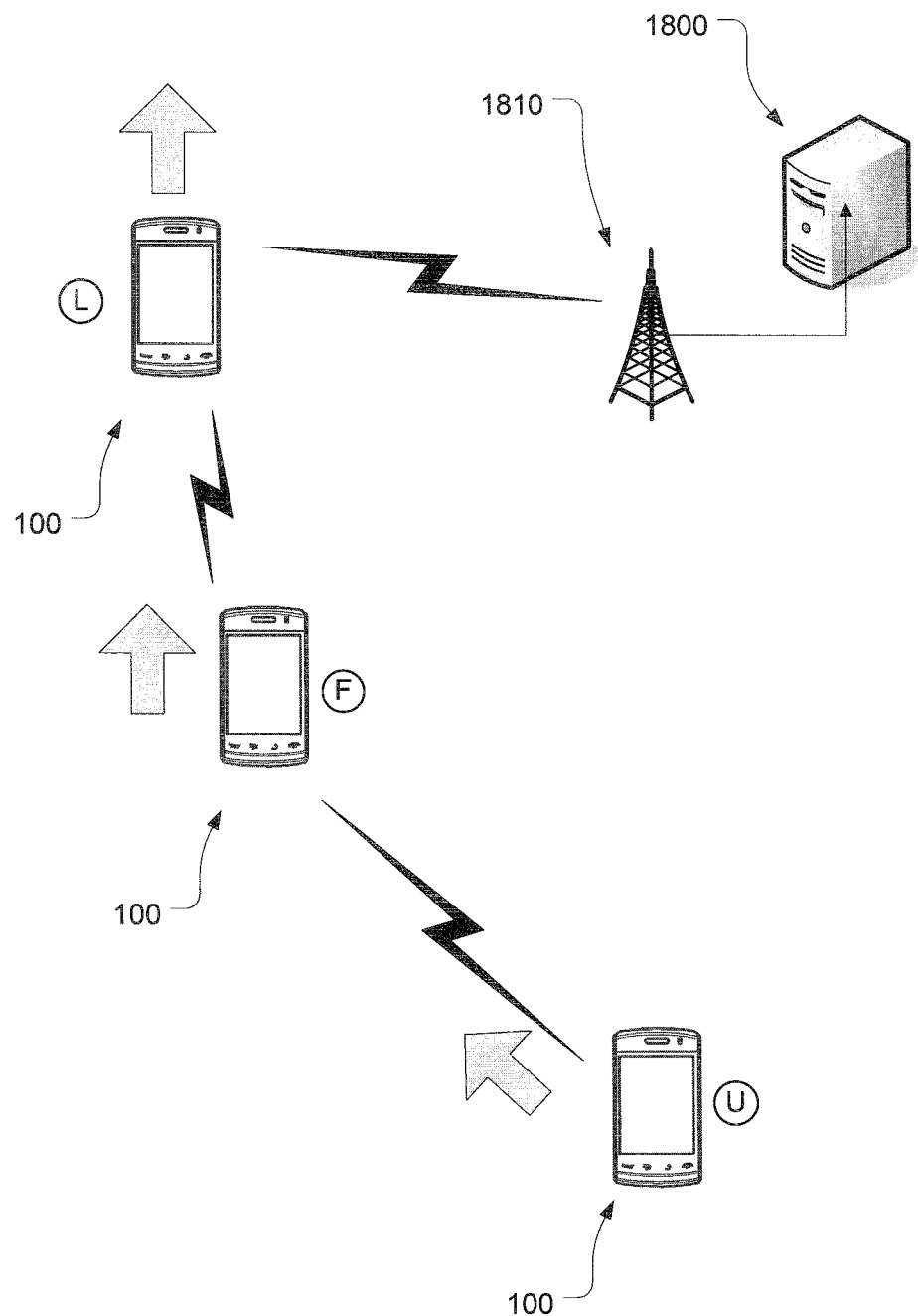
FIG. 20 depicts a concatenated tracking method in which the lead device transmits tracking data to a first tracking device and the first tracking device relays the tracking data to a second tracking device.

FIG. 20 depicts a variant of the peer-to-peer method of FIG. 19. FIG. 20 depicts a concatenated tracking method in which the lead device transmits tracking data to a first tracking device and the first tracking device relays the tracking data to a second tracking device. The first tracking device may communicate with the second tracking device using a short-range wireless transceiver.

As was the case with the system of FIG. 18, the systems of FIGS. 19 and 20 may entail encrypting the tracking data for privacy reasons so that only the users of the "follow me" group can access this data.

The foregoing methods can be implemented as coded instructions in a computer readable medium (machine readable medium or computer program product). A computer-readable medium is a physical storage medium upon which software code is recorded electronically, magnetically or optically to perform the foregoing steps when the computer readable medium is loaded into memory and executed on the microprocessor of a wireless communications device, mobile device or other computing device. The methods may be implemented not only in software but also in hardware or firmware, or any suitable combination of hardware, software and firmware.

This software may be incorporated as a module within a navigation application, or it may be an application that cooperates with a navigation or mapping application, or it may be a self-contained (standalone) application that also performs the mapping and navigation functions.

For the foregoing methods, it should be appreciated that current location data may be obtained using a GPS chipset receiver. GPS signals from multiple orbiting GPS satellites provide a position fix accurate to within a few meters. Assisted GPS technologies and Aided GPS technologies can also be used to increase the time-to-first-fix (TTFF). Position data can also be obtained or supplemented using by radiolocation techniques involving triangulation of base station signals and time of arrival calculations, though these techniques are less accurate than GPS, which provides the desired accuracy for road-based navigation.

Although the present disclosure refers to expressly to the "Global Positioning System", it should be understood that this term and its abbreviation "GPS" are being used expansively to include any satellite-based navigation-signal broadcast system, and would therefore include other systems used around the world including the Beidou (COMPASS) system being developed by China, the multi-national Galileo system being developed by the European Union, in collaboration with China, Israel, India, Morocco, Saudi Arabia and South Korea, Russia's GLONASS system, India's proposed Regional Navigational Satellite System (IRNSS), and Japan's proposed QZSS regional system.

For the purposes of this specification, "speed data" means data pertaining to the speed, velocity or rate of travel of the device being followed. The speed data can be an average speed determined using the rate of change of (GPS-determined) position over time. Alternatively, speed data can be an instantaneous velocity obtained using a velocity sensor/transducer that is embedded or connected to the device. As a further alternative, the device may receive speed data wirelessly (e.g. via Bluetooth® from a vehicle speed sensor). The speed data may include the speed as a scalar value (just the magnitude) or it may include a velocity vector (both speed and direction or heading). Where path data is also provided, the velocity vector is unnecessary since direction (heading) is already known from the path data). Speed data is useful to the recipient (second mobile user) to know how fast the first mobile user is traveling, and thus whether he should consider traveling faster to catch up.

For the purposes of this specification, "time data" means data pertaining to the actual time of day of the first mobile device when it is at a particular location or the time elapsed since the last position fix or the time elapsed between the position fix and the receipt of the tracking data by the second mobile user. In other words, time data accompanying the GPS position fix gives important context to the location data by telling the recipient (the second mobile user) that the first mobile user was at that particular location at that particular time. Merely providing the location is not nearly as informative since the recipient might not have a good sense as to exactly when the first mobile user was at that location. In other words, time data enables the recipient to know how old or stale the position fix really is.

For the purposes of this specification, "path data" means data pertaining to the path or route that the first mobile device has taken. This can be provided as path segments (just the portion of the path that the device has traveled since the previously fix was obtained) or as a cumulative path that shows the entire path the device has traveled since tracking was initiated. Alternatively, the receiving device can store all the path data but only display the cumulative path data that fits within the bounding box of at the map scale selected. The path data may include a sequential list of all street names and highway numbers that define the path taken by the lead device along with the direction taken along each one, thus constituting navigation instructions for the recipient. Alternatively, the path data can be vector data that enables the recipient device to render a map of the path with the path highlighted using one of any number of standard mapping applications. Alternatively, a bitmap showing the route/path highlighted can be generated by the lead device and transmitted to the recipient device for immediate viewing onscreen. Optionally, the efficiency of this tracking method or following method can be improved by simplifying the path data to reduce the amount of data being generated and transmitted without unduly sacrificing travel path fidelity. Techniques such as the Douglas Peuker line simplification algorithm can be used to reduce the number of points required to describe a path (e.g. by eliminating common points along a straight line).

As will appreciated, the path data effectively subsumes the current position data because the destination point of each path segment of the path data corresponds to each of the position fixes. The path data is presented as a graphically highlighted route on a map (with optional navigation instructions presented either graphically or audibly). The current position fix is thus used to define the endpoint or destination of the path. The second mobile device (the following device) may optionally present the destination of the path (which is defined by the GPS position fix) either as a destination street address and/or as longitude and latitude coordinates.

In another implementation, the second mobile device could also optionally present a distance to the first mobile device. This distance could be in terms of actual road distance in kilometers (or miles) or meters (or yards). The distance could alternatively be presented in terms of straight-line distance (the distance "as a crow flies") along with the compass bearing (e.g. "northeast" or 045 degrees). In addition to, or in lieu of, distance, an estimated time ("estimated time of arrival") to the current location of the first mobile user can be provided or the time to convergence can be presented (the time required to catch up to the first mobile user or to arrive within a prescribed range of the first user, such as, for example, the range at which the Bluetooth® proximity detection was triggered). Thus, in this variant of the implementation, a "trip computer" module can be provided as a software application on the device to compute various distances, compass bearings and times.

In addition to the graphical representation of the tracking data in the form of icons on a map, audible reports can be used to supplement or replace certain aspects of the tracking data, e.g. using text-to-speech turn-by-turn navigation that read aloud the street names, audibly reporting speed, time and position data in addition to displaying it onscreen.

Although car icons are depicted by way of example in the above-described figures, it should be understood that this technology applies to other road vehicles (e.g. trucks, vans, buses, motorcycles, scooters), or to off-road vehicles (e.g. snowmobiles, ATVs), or to watercraft (e.g. motorboats, yachts, sailboats, personal watercraft, jet skis) or to bicyclists or even to mobile users who are merely walking on foot.

It should also be appreciated that the follower could also be a static (non-mobile) follower, i.e. a user of a stationary computing device, who is only visually following, or visually tracking, the lead user's movements. Although the exemplary computing device discussed in the above description is shown as a wireless communications device, the computing device can also be a desktop computer, laptop, or other such computing device that has a processor, memory and communications port for receiving the real-time tracking data. Even for a fixed computing device, the communications port can be wireless or wire-line.

This new technology has been described in terms of specific implementations and configurations which are intended to be exemplary only. Persons of ordinary skill in the art will appreciated, having read this disclosure, that many obvious variations, modification and refinements may be made without departing from the inventive concepts presented herein. The scope of the exclusive right sought by the Applicant(s) is therefore intended to be limited solely by the appended claims.

The invention claimed is:

1. A method of tracking a lead mobile device, the method comprising:
   receiving tracking data that includes a current location for both the lead mobile device and at least one other mobile device that is also tracking the lead device;
   displaying visually distinctive graphical representations on a map of the current locations of the lead device and of the at least one other mobile device that is also receiving the tracking data to thereby enable each of the lead mobile device, the at least one other mobile device and a user device to be identified by a respective graphical representation, wherein the lead device and the at least one other following device are represented by visually distinctive icons that visually distinguish the lead device from the at least one other following device and also visually distinguish the mobile device from the at least one other following device that is also tracking the lead device; and
   receiving user input with respect to one of the icons displayed on the map to select a new mobile device as the lead mobile device.

2. The method as claimed in claim 1 wherein receiving the user input comprises receiving touch input on one of the icons displayed on the map to select the new mobile device as the lead mobile device.

3. The method as claimed in claim 1 wherein receiving tracking data is triggered when a short-range wireless proximity detector loses a connection with the lead device.

4. The method as claimed in claim 1 wherein the tracking data further includes one or more of speed, heading and path.

5. The method as claimed in claim 1 further comprising:
   while displaying the map, also displaying a user interface element that is configured to initiate a conference call; and
   initiating the conference call in response to receiving touch input on the user interface element.

6. The method as claimed in claim 1 further comprising:
   while displaying the map, also displaying a user interface element that is configured to call the lead mobile device; and
   calling the lead mobile device in response to receiving touch input on the user interface element.

7. The method as claimed in claim 1 further comprising:
   while displaying the map, also displaying a user interface element that is configured to initiate a conference call with the lead mobile device and the least one other mobile device; and
   initiating the conference call in response to receiving touch input on the user interface element.

8. A method of sharing tracking data on a mobile device with a plurality of other mobile devices, the method comprising:
   activating a communication application;
   receiving user input within the communication application to cause the mobile device to initiate a tracking mode that includes collecting tracking data for sharing with the plurality of other mobile devices that have been identified using the communication application as recipients of the tracking data; and
   transmitting the tracking data to the plurality of other mobile devices.

9. The method as claimed in claim 8 wherein the tracking data comprises one or more of a current location, speed, path and heading.

10. The method as claimed in claim 8 wherein the communication application is an e-mail application.

11. The method as claimed in claim 8 wherein the communication application is an instant messaging application.

12. The method as claimed in claim 8 wherein the communication is a social networking application.

13. The method as claimed in claim 8 further comprising temporarily deactivating tracking when a short-range wireless proximity detector trigger regains a connection with the device.

14. The method as claimed in claim 8 further comprising displaying a map showing a current location of the mobile device that is transmitting the tracking data as well as current locations of the plurality of other mobile devices.

15. A mobile device for tracking both a lead device and at least one other following device that is also tracking the lead device, the mobile device comprising:
   a processor operable to control operation of the mobile device;
   a positioning system operatively coupled to the processor to determine a current location of the mobile device;
   a radio-frequency transceiver operatively coupled to the processor to receive tracking data that includes current locations of the lead device and of the at least one other following device;
   a memory operatively coupled to the processor to store the current locations of the mobile device, the lead device and the at least one other following device; and
   a display screen operatively coupled to the processor to display visually distinctive graphical representations on a map of the current locations of the mobile device, the lead device, and the at least one other following device, wherein the current locations of the lead device and of the at least one other following device are represented by visually distinctive icons that visually distinguish the lead device from the at least one other following device and also visually distinguish the mobile device from the at least one other following device that is also tracking the lead device; and wherein the processor causes the display screen to display a new mobile device as the lead device in response to user input selecting the new mobile device as the lead device.

16. The mobile device as claimed in claim 15 wherein the display screen receives the user input on one of the icons displayed on the map to select the new mobile device as the lead device.

17. The mobile device as claimed in claim 15 comprising a short-range wireless proximity detector that triggers tracking when the proximity detector loses a connection with the lead device.

18. A mobile device for sharing tracking data, the mobile device comprising:
   a memory storing a communication application;
   a processor operatively coupled to the memory to execute the communication application;
   a radio-frequency transceiver to communicate with a plurality of other mobile devices via the communication application;
   a positioning subsystem operatively coupled to the processor to determine a current location of the mobile device from which the tracking data is generated; and
   a user input device operable to receive user input from within the communication application that causes the mobile device to initiate a tracking mode that includes collecting tracking data for sharing with the plurality of other mobile devices that have been identified using the communication application as recipients of the tracking data and to transmit the tracking data to the plurality of other mobile devices.

19. The mobile device as claimed in claim 18 comprising a short-range wireless proximity detector that triggers transmission of the tracking data when the proximity detector loses a connection with a lead device.

20. The mobile device as claimed in claim 18 wherein the tracking data comprises one or more of speed, heading and path data.

21. The mobile device as claimed in claim 18 wherein the communication application is an e-mail application.

22. The mobile device as claimed in claim 18 wherein the communication application is an instant messaging application.

23. The mobile device as claimed in claim 18 wherein the communication application is a social networking application.

24. The mobile device as claimed in claim 18 wherein the memory and processor are operable to recognize user input received by the user input device as a command to initiate a conference call involving the mobile device and the plurality of other mobile devices.

* * * * *